(12) United States Patent
Miyoshi et al.

(10) Patent No.: US 9,078,006 B2
(45) Date of Patent: *Jul. 7, 2015

(54) VIDEO ENCODER AND VIDEO DECODER

(75) Inventors: Hidenobu Miyoshi, Kawasaki (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 614 days.

This patent is subject to a terminal disclaimer.

(21) Appl. No.: 13/541,220

(22) Filed: Jul. 3, 2012

(65) Prior Publication Data

US 2013/0010870 A1    Jan. 10, 2013

Related U.S. Application Data

(63) Continuation of application No. PCT/JP2010/000101, filed on Jan. 8, 2010.

(51) Int. Cl.
*H04N 11/02* (2006.01)
*H04N 19/573* (2014.01)
(Continued)

(52) U.S. Cl.
CPC ........... *H04N 19/573* (2014.11); *H04N 19/176* (2014.11); *H04N 19/13* (2014.11); *H04N 19/146* (2014.11)

(58) Field of Classification Search
CPC ................ H04N 19/573; H04N 19/61; H04N 19/00587; H04N 19/109; H04N 19/13; H04N 19/146; H04N 19/176; H04N 19/52; H04N 19/12; H04N 19/51; H04N 19/577; H04N 19/60
USPC ....................................... 375/240.01–240.29
See application file for complete search history.

(56) References Cited

U.S. PATENT DOCUMENTS 5,235,419 A * 8/1993 Krause .................... 375/240.16
6,430,224 B1 * 8/2002 Naito et al. .............. 375/240.16
(Continued)

FOREIGN PATENT DOCUMENTS

JP    03-283989    12/1991
JP    06-232765    8/1994
(Continued)

OTHER PUBLICATIONS

International Search Report for PCT/JP2009/007360 mailed Apr. 13, 2010.
(Continued)

*Primary Examiner* — Sath V Perungavoor
*Assistant Examiner* — Nathnael Aynalem
(74) *Attorney, Agent, or Firm* — Staas & Halsey LLP

(57) ABSTRACT

A video encoder includes: a motion compensation picture signal generator that generates a plurality of motion compensation picture signals in accordance with an encoding target signal and a plurality of reference pictures; a prediction signal generator that generates a prediction signal of the encoding target signal using the motion compensation picture signals; a prediction error signal generator that generates a prediction error signal representing a difference between the encoding target signal and the prediction signal; a selector that selects an entropy code assignment rule that is expected to minimize an information amount of an encoded state of the prediction error signal from a plurality of entropy code assignment rules for encoding the prediction error signal in accordance with the motion compensation picture signals; and an entropy encoder that generates encoded information from the prediction error signal in accordance with the selected entropy code assignment rule.

23 Claims, 20 Drawing Sheets

(51) Int. Cl.
*H04N 19/176* (2014.01)
*H04N 19/13* (2014.01)
*H04N 19/146* (2014.01)

(56) References Cited

U.S. PATENT DOCUMENTS

| | | | |
|---|---|---|---|
| 6,785,331 B1 * | 8/2004 | Jozawa et al. | 375/240.12 |
| 2003/0048208 A1 * | 3/2003 | Karczewicz | 341/67 |
| 2003/0103679 A1 | 6/2003 | Etoh et al. | |
| 2003/0112870 A1 * | 6/2003 | Fukuda et al. | 375/240.12 |
| 2004/0233990 A1 * | 11/2004 | Sekiguchi et al. | 375/240.16 |
| 2007/0189396 A1 | 8/2007 | Kitahara et al. | |
| 2008/0240240 A1 * | 10/2008 | Kodama | 375/240.14 |
| 2009/0097571 A1 * | 4/2009 | Yamada et al. | 375/240.25 |
| 2010/0246680 A1 * | 9/2010 | Tian et al. | 375/240.16 |

FOREIGN PATENT DOCUMENTS

| | | |
|---|---|---|
| JP | 2000-059785 | 2/2000 |
| JP | 2001-094982 | 4/2001 |
| JP | 2002-314428 | 10/2002 |
| JP | 2002-315006 | 10/2002 |
| JP | 2005-86384 | 3/2005 |
| JP | 2008-092456 | 4/2008 |
| WO | 2006/073116 | 7/2006 |

OTHER PUBLICATIONS

Written Opinion of the International Searching Authority mailed Apr. 13, 2010 in corresponding International Patent Application No. PCT/JP2009/007360.

International Preliminary Report on Patentability mailed Jul. 4, 2012 issued in corresponding International Patent Application No. PCT/JP2009/007360.

Japanese Office Action mailed Dec. 24, 2013 in corresponding Japanese Application No. 2011-548865.

International Preliminary Report on Patentability issued Jul. 10, 2012 in corresponding International Patent Application No. PCT/JP2010/000101.

English Translation of the Written Opinion of the International Searching Authority issued Aug. 7, 2012 in corresponding International Patent Application No. PCT/JP2010/000101.

International Search Report mailed Apr. 13, 2010 in corresponding International Application No. PCT/JP2010/000101.

* cited by examiner

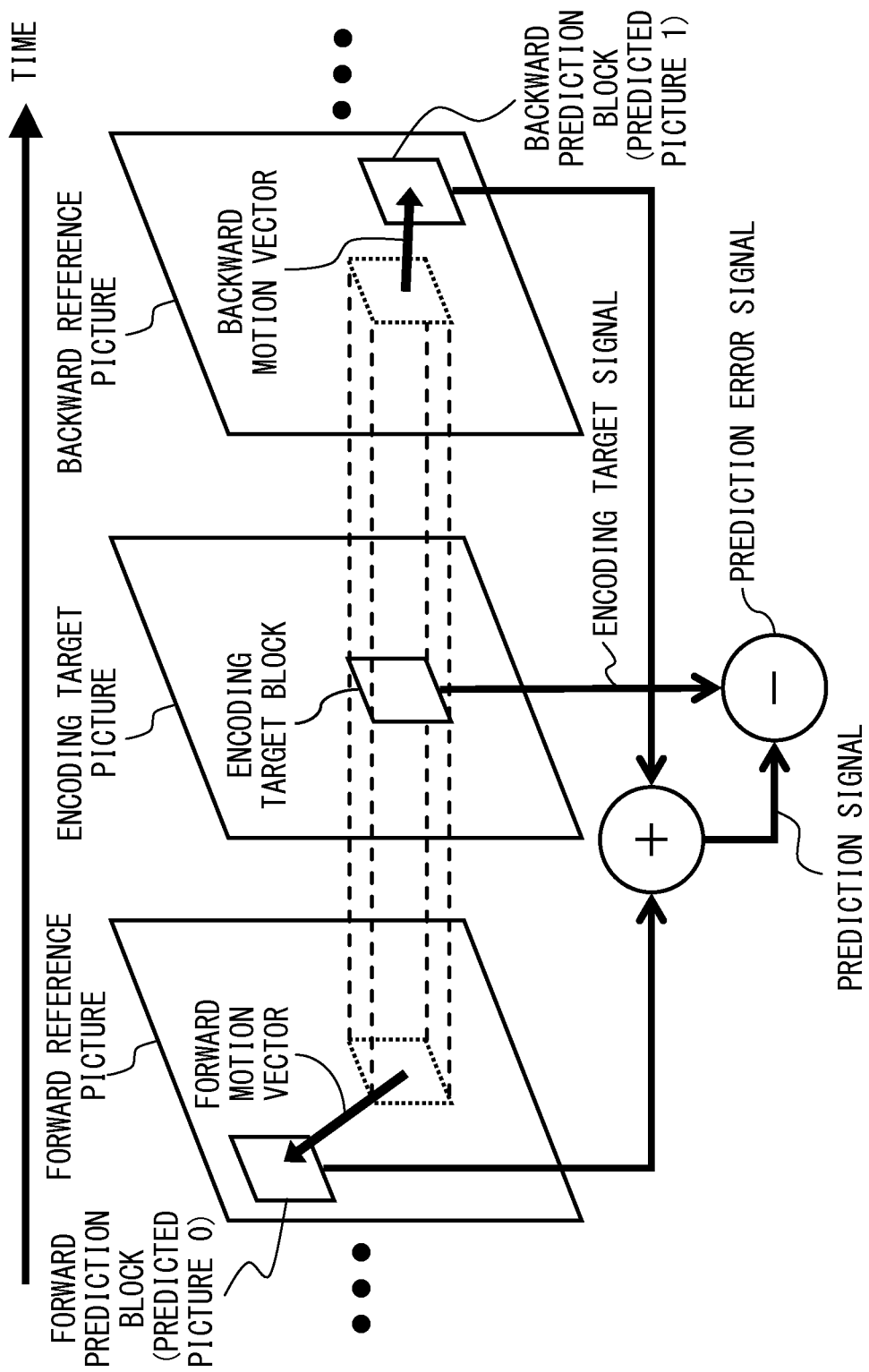
F I G. 3

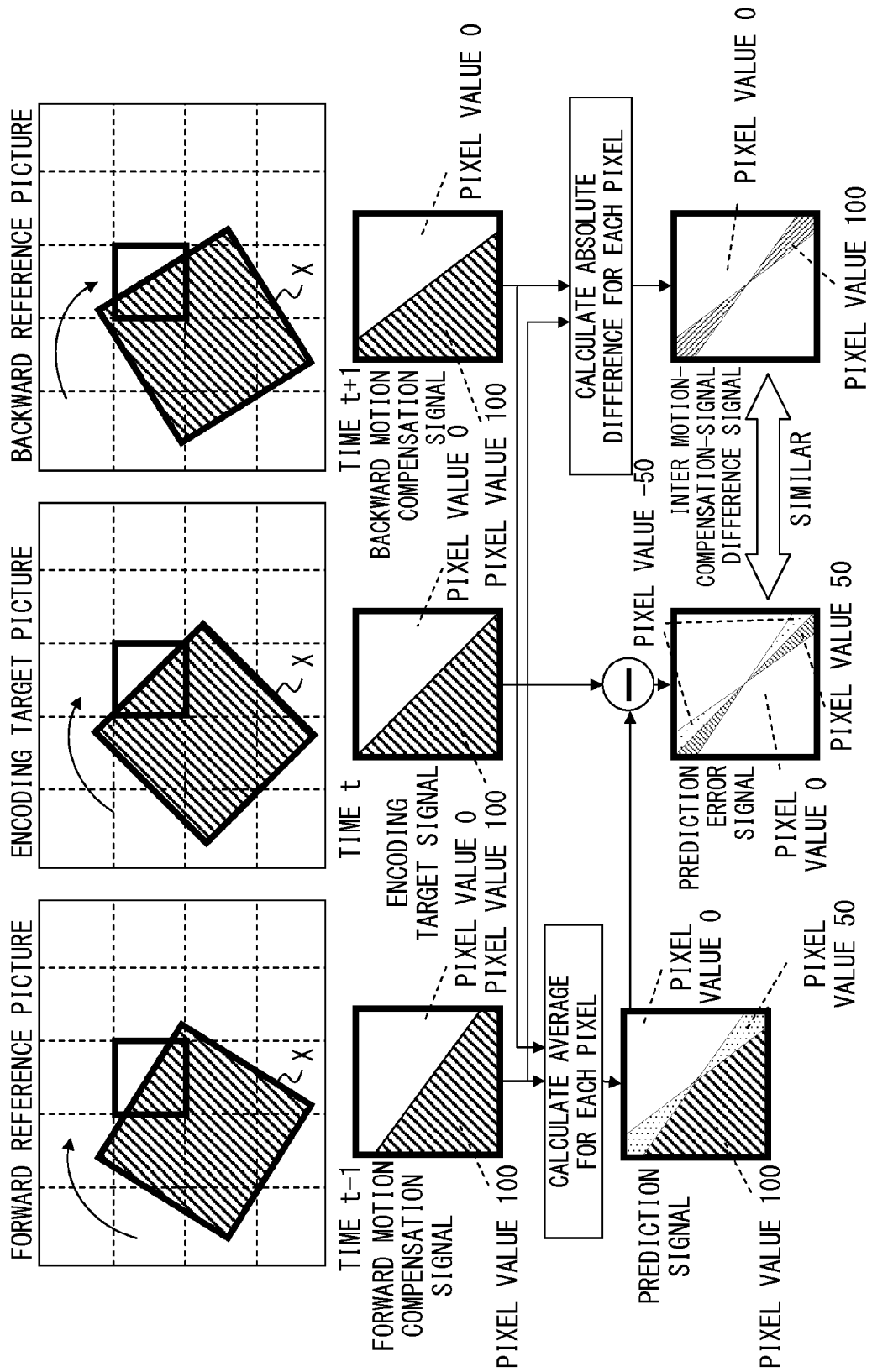
F I G. 4

| TrailingOnes | TotalCoeff | TABLE 0<br>0≦nP<2 | TABLE 1<br>2≦nP<4 | TABLE 2<br>4≦nP<8 | TABLE 3<br>8≦nP | TABLE 4<br>Np = -1 | TABLE 5<br>nP = -2 |
|---|---|---|---|---|---|---|---|
| 0 | 0 | 1 | 11 | 1111 | 0000 11 | 01 | 1 |
| 0 | 1 | 0001 01 | 0010 11 | 0011 11 | 0000 00 | 0001 11 | 0001 111 |
| 1 | 1 | 01 | 10 | 1110 | 0000 01 | 1 | 01 |
| 0 | 2 | 0000 0111 | 0001 11 | 0010 11 | 0001 00 | 0001 00 | 0001 110 |
| 1 | 2 | 0001 00 | 0011 1 | 0111 1 | 0001 01 | 0001 10 | 0001 101 |
| 2 | 2 | 001 | 011 | 1101 | 0001 10 | 001 | 001 |

F I G. 6 A

| TrailingOnes | TotalCoeff | TABLE 0<br>0≦nP<2 | TABLE 1<br>2≦nP<4 | TABLE 2<br>4≦nP<8 | TABLE 3<br>8≦nP | TABLE 4<br>Np = -1 | TABLE 5<br>nP = -2 |
|---|---|---|---|---|---|---|---|
| 0 | 3 | 0000 0011 1 | 0000 111 | 0010 00 | 0010 00 | 0000 11 | 0000 0011 1 |
| 1 | 3 | 0000 0110 | 0010 10 | 0110 0 | 0010 01 | 0000 011 | 00001 100 |
| 2 | 3 | 0000 101 | 0010 01 | 0111 0 | 0010 10 | 0000 010 | 0001 011 |
| 3 | 3 | 0001 1 | 0101 | 1100 | 0010 11 | 00001 01 | 0000 1 |
| 0 | 4 | 0000 0001 11 | 0000 0111 | 0001 111 | 0011 00 | 0000 10 | 0000 0011 0 |
| 1 | 4 | 0000 0011 0 | 0001 10 | 0101 0 | 0011 01 | 0000 00 | 0000 0010 1 |
| 2 | 4 | 0000 0101 | 0001 01 | 0101 1 | 0011 10 | — | 0001 010 |
| 3 | 4 | 0000 11 | 0100 | 1011 | 0011 11 | — | 0000 01 |

F I G. 6 B

| TrailingOnes | TotalCoeff | TABLE 0<br>0≦nP<2 | TABLE 1<br>2≦nP<4 | TABLE 2<br>4≦nP<8 | TABLE 3<br>8≦nP | TABLE 4<br>Np = -1 | TABLE 5<br>nP = -2 |
|---|---|---|---|---|---|---|---|
| 0 | 5 | 0000 0000 111 | 0000 0100 | 0001 011 | 0100 00 | — | 0000 0001 11 |
| 1 | 5 | 0000 0001 10 | 0000 110 | 0100 0 | 0100 01 | — | 0000 0001 10 |
| 2 | 5 | 0000 0010 1 | 0000 101 | 0100 1 | 0100 10 | — | 0000 0010 0 |
| 3 | 5 | 0000 100 | 0011 0 | 1010 | 0100 11 | — | 0001 001 |
| 0 | 6 | 0000 0000 0111 1 | 0000 0011 1 | 0001 001 | 0101 00 | — | 0000 0000 111 |
| 1 | 6 | 0000 0000 110 | 0000 0110 | 0011 10 | 0101 01 | — | 0000 0000 110 |
| 2 | 6 | 0000 0001 01 | 0000 0101 | 0011 01 | 0101 10 | — | 0000 0001 01 |
| 3 | 6 | 0000 0100 | 0010 00 | 1001 | 010 11 | — | 0001 00 |

F I G. 6 C

| TrailingOnes | TotalCoeff | TABLE 0<br>0≦nP<2 | TABLE 1<br>2≦nP<4 | TABLE 2<br>4≦nP<8 | TABLE 3<br>8≦nP | TABLE 4<br>Np = -1 | TABLE 5<br>nP = -2 |
|---|---|---|---|---|---|---|---|
| 0 | 7 | 0000 0000 0101 1 | 0000 0001 111 | 0001 000 | 0110 00 | — | 0000 0000 0111 |
| 1 | 7 | 0000 0000 0111 0 | 0000 0011 0 | 0010 10 | 0110 01 | — | 0000 0000 0110 |
| 2 | 7 | 0000 0000 101 | 0000 0010 1 | 0010 01 | 0110 10 | — | 0000 0000 101 |
| 3 | 7 | 0000 0010 0 | 0001 00 | 1000 | 0110 11 | — | 0000 0001 00 |
| 0 | 8 | 0000 0000 0100 0 | 0000 0001 011 | 0000 1111 | 0111 00 | — | 0000 0000 0011 1 |
| ⋮ | | | | ⋯ | | | |
| 3 | 16 | 0000 0000 0000 1000 | 0000 0000 0001 00 | 0000 0000 10 | 1111 11 | — | |

F I G. 6 D

| 120 | −10 | 10 | 0 |
|---|---|---|---|
| 20 | 0 | 0 | 0 |
| 0 | 0 | −1 | 0 |
| 2 | 0 | 0 | 0 |

FIG. 10

| 100 | −20 | 5 | 0 |
|---|---|---|---|
| 10 | 0 | 0 | 0 |
| 0 | 0 | 1 | 0 |
| −1 | 0 | 0 | 0 |

QUANTIZED TRANSFORM
COEFFICIENTS

F I G. 1 1 A

ZIG ZAG SCAN

F I G. 1 1 B

| 100 | −20 | 10 | 0 | 0 | 5 | 0 | 0 | 0 | −1 | 0 | 1 | 0 | 0 | 0 | 0 |

SCANNED TRANSFORM COEFFICIENTS

F I G. 1 1 C

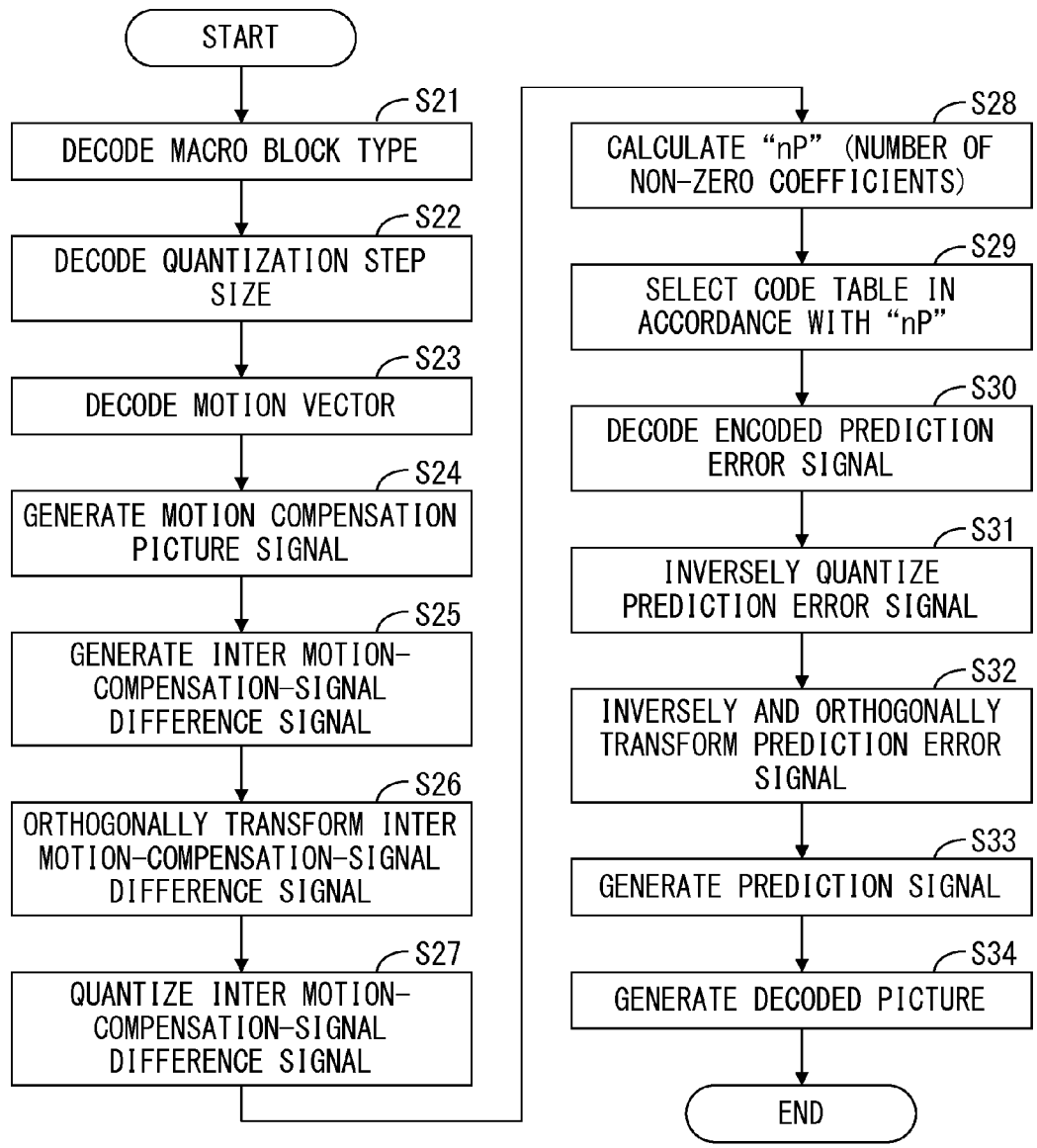
F I G. 1 3

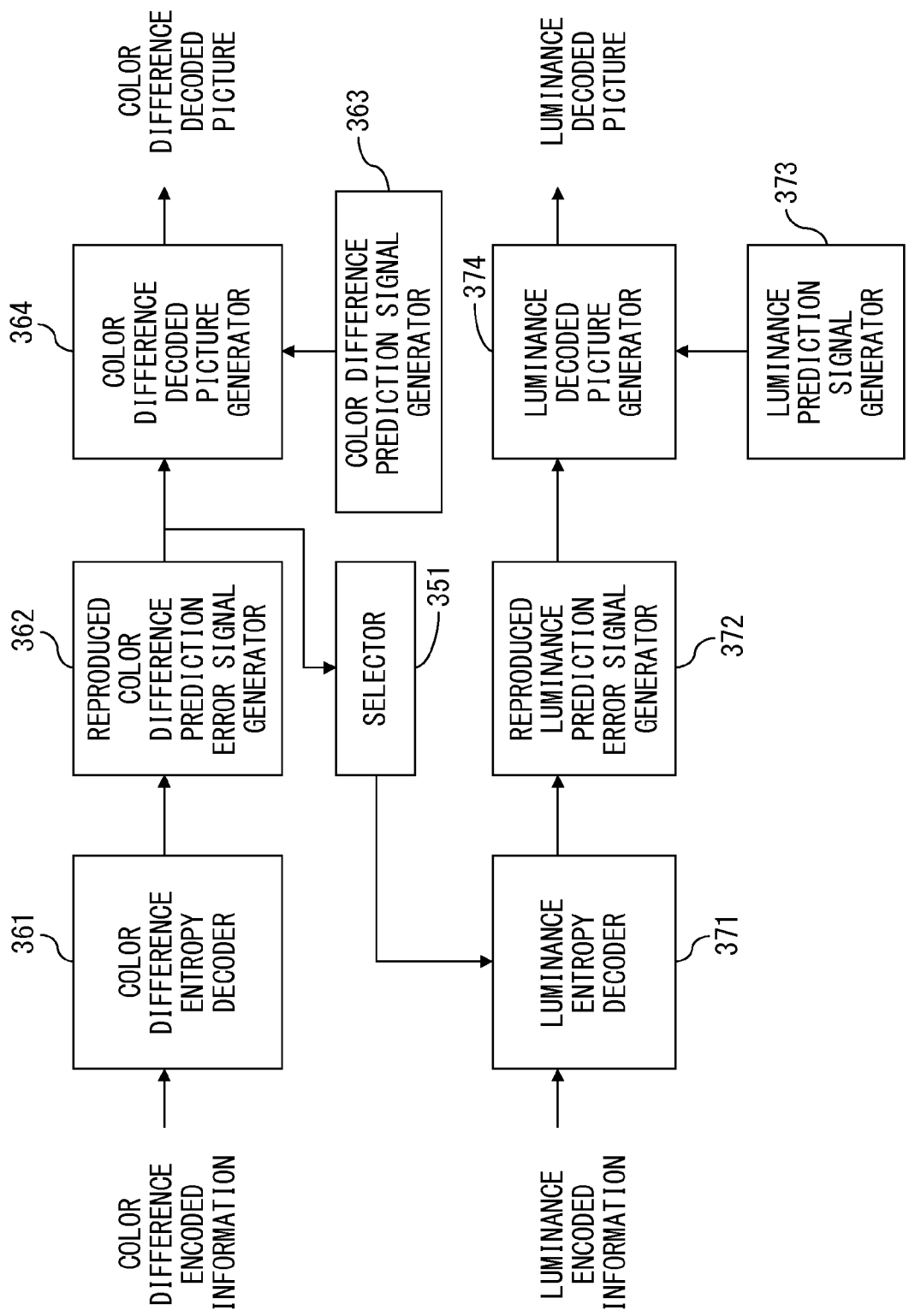
F I G. 16

VIDEO ENCODER AND VIDEO DECODER

CROSS-REFERENCE TO RELATED APPLICATION

This application is a continuation application of International Application PCT/JP2010/000101 filed on Jan. 8, 2010 and designated the U.S., the entire contents of which are incorporated herein by reference.

FIELD

The embodiments described herein are related to an encoder, an encoding method, and an encoding program to encode video data, and also to a decoder, a decoding method, and a decoding program to decode encoded video data.

BACKGROUND

Video data is encoded in highly efficient encoding scheme when it is transmitted from a transmitter device to a receiver device, when it is stored in a storage device, or in other situations. "Highly efficient encoding" is an encoding process to transform a data stream into a different data stream in order to compress the data volume.

As a highly efficient encoding method for video data, an intra-picture prediction (intra prediction) encoding scheme is known. This encoding scheme utilizes a high spatial correlation in video data. That is to say, in this encoding scheme it is possible to restore an image in a picture by using only information included in that picture without using other pictures. As another highly efficient encoding method, an inter-picture prediction (inter prediction) encoding scheme is known. This encoding scheme utilizes characteristic in which video data has a high correlation in time direction. Note that a picture at certain timing is similar to a picture at an immediately previous timing in video data. Inter-prediction encoding scheme utilizes this characteristic so as to encode pictures.

According to the inter-picture prediction encoding scheme, a current picture is divided into a plurality of blocks. An encoder selects, for each block, a region similar to the current picture block from the decoded picture of an encoded frame, and calculates the difference between the selected similar region and the current picture block so as to remove redundancy in time direction. Then, vector information representing the similar region and the difference information with the redundancy having been removed are encoded so as to achieve a high compression rate.

For example, in a data transmission system employing inter-prediction encoding, a transmitter device generates motion vector data representing "motion" toward a target picture from the previous picture, and also generates difference data between the predicted image of the target picture and the actual image of the target picture, and transmits to the receiver device the generated motion vector data and difference data. The predicted image is generated using the previous picture and the motion vector data. The receiver device reproduces the target picture from the received motion vector data and difference data. Note that as moving picture encoding schemes, there are ISO/IEC MPEG-2 and MPEG-4 (hereinafter, referred to as MPEG-2 and MPEG-4).

According to MPEG-2, I-picture, P-picture, and B-picture are defined. The I-picture is obtained by encoding information only within the picture. The P-picture is obtained by performing forward-direction inter-picture prediction in accordance with a past picture and encoding the prediction error. The B-picture is obtained by performing bi-directional inter-picture prediction in accordance with a past picture and a future picture, and encoding the prediction error.

Highly efficient methods (i.e., a high compression rate) are desirable in video encoding/decoding. As a method for enhancing encoding/decoding efficiency, a signal encoding method including the first through third steps described below is proposed. The first step obtains as a reference signal a signal in a correlation with an encoding target signal. The second step derives, in accordance with the characteristic of the obtained reference signal, a transform basis serving as fundamentals of the transform rule. The third step transforms the encoding target signal in accordance with the transform rule based on the derived transform basis so as to encode the encoding target signal. (Japanese Laid-open Patent Publication No. 2002-314428 for example)

Also, as a related technique, a predictive decoding device is proposed in Japanese Laid-open Patent Publication No. 2000-59785.

As described above, highly efficient methods are desirable for video encoding and decoding. Further, various methods for enhancing efficiency in encoding/decoding are proposed. However, further improvement is required in encoding and decoding of video data.

When, for example, image information is encoded, an orthogonal transform or the like may be performed in order to generate a coefficient sequence representing that image information. The generated coefficient sequence is scanned using a specified pattern, and thereafter entropy encoded. However, according to conventional techniques, the encoding/decoding efficiency becomes lower depending upon characteristics of images.

SUMMARY

According to an aspect of the embodiments, a video encoder includes: a motion compensation picture signal generator configured to generate a plurality of motion compensation picture signals in accordance with an encoding target signal representing an encoding target picture and a plurality of reference pictures; a prediction signal generator configured to generate a prediction signal of the encoding target signal by utilizing the plurality of motion compensation picture signals; a prediction error signal generator configured to generate a prediction error signal representing a difference between the encoding target signal and the prediction signal; a selector configured to select an entropy code assignment rule that is expected to minimize an information amount of an encoded state of the prediction error signal from among a plurality of entropy code assignment rules for encoding the prediction error signal, in accordance with the plurality of motion compensation picture signals; and an entropy encoder configured to generate encoded information from the prediction error signal in accordance with the entropy code assignment rule selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 explains bi-directional prediction;

FIG. 4 explains a correlation between a prediction error signal and an inter motion-compensation-signal difference signal;

FIGS. 6A-6D illustrate examples of an entropy code table;

FIG. 10 illustrates an example of an inter motion-compensation-signal difference signal;

FIG. 13 is a flowchart explaining a decoding method according to the first embodiment;

FIG. 16 illustrates a configuration of a decoder according to the third embodiment.

DESCRIPTION OF EMBODIMENTS

Figure 1:
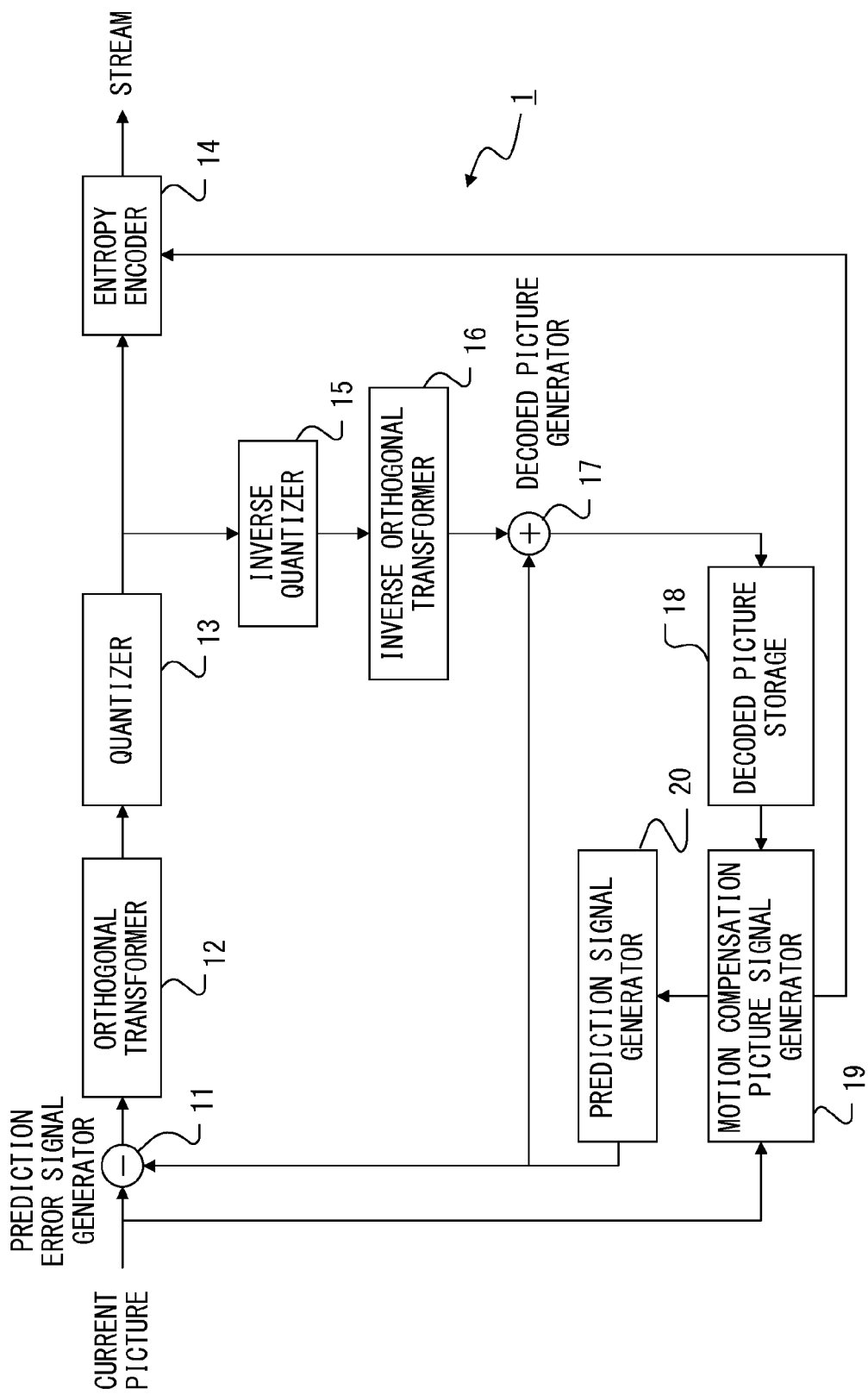
FIG. 1 illustrates a configuration of a video encoder according to an embodiment.

FIG. 1 illustrates a configuration of a video encoder according to an embodiment. A video encoder 1 illustrated in FIG. 1 includes a prediction error signal generator 11, an orthogonal transformer 12, a quantizer 13, an entropy encoder 14, an inverse quantizer 15, an inverse orthogonal transformer 16, a decoded picture generator 17, a decoded picture storage 18, a motion compensation picture signal generator 19, and a prediction signal generator 20. The video encoder 1 divides each picture of a video into a plurality of blocks, and performs an encoding process on each of the blocks. The size of the blocks may be fixed or may be variable.

Block data representing the image in each block obtained by dividing a current picture (an encoding target picture) is input to the prediction error signal generator 11. The size of a block is, for example, 16×16 pixels (macro block). The prediction error signal generator 11 calculates the difference between the encoding target block data and the block data (prediction signal) of a predicted picture provided by the prediction signal generator 20 so as to generate a prediction error signal.

The orthogonal transformer 12 performs an orthogonal transform process on the prediction error signal. This orthogonal transform generates a frequency domain signal having horizontal frequency components and vertical frequency components separated from each other. The orthogonal transform is, for example, a discrete cosine transform (DCT). The quantizer 13 quantizes a signal output from the orthogonal transformer 12. By the quantization, the amount of codes of a transformed prediction error signal is reduced. A signal output from the quantizer 13 is provided to the entropy encoder 14 and the inverse quantizer 15.

The entropy encoder 14 scans a signal (a plurality of coefficients) output from the quantizer 13 in accordance with a specified or selected scan pattern, and generates run-level information. Run-level information includes information representing a value of a coefficient that is not zero, information representing a length over which zeros continue, and the like. The entropy encoder 14 performs entropy encoding (variable-length encoding) on the generated run-level information. In entropy encoding, a code having variable length is assigned in accordance with the appearance frequency of symbols.

The inverse quantizer 15 inversely quantizes a signal output from the quantizer 13. The inverse orthogonal transformer 16 performs inverse orthogonal transform on a signal output from the inverse quantizer 15. Processes performed by the inverse quantizer 15 and the inverse orthogonal transformer 16 correspond to processes performed by the quantizer 13 and the orthogonal transformer 12, respectively. In other words, by performing decoding processes by using the inverse quantizer 15 and the inverse orthogonal transformer 16, a signal similar to the prediction error signal (referred to as a reproduced prediction error signal, hereinafter) is obtained.

The decoded picture generator 17 adds, to block data of a predicted image generated by the prediction signal generator 20, a reproduced prediction error signal output from the inverse orthogonal transformer 16. Thereby, a locally decoded picture is generated. The decoded picture storage 18 stores, as data of a reference picture, block data generated by the decoded picture generator 17.

The motion compensation picture signal generator 19 calculates the motion vector of the encoding target block according to block data of an encoding target block of the current picture and block data of a reference picture stored in the decoded picture storage 18. A motion vector represents a spatial shift between the current picture and a reference picture, and is implemented by, for example, a block matching technique, which searches for the position of the block in a reference picture that is the most similar to the encoding target block in the current picture. The motion compensation picture signal generator 19 performs motion compensation in accordance with the motion vector, and generates block data of the reference picture to which motion compensation has been applied.

The prediction signal generator 20 generates a prediction signal of an encoding target signal in accordance with the block data of a reference picture obtained by the motion compensation picture signal generator 19. This prediction signal is provided to the prediction error signal generator 11 as described above.

Figure 2:
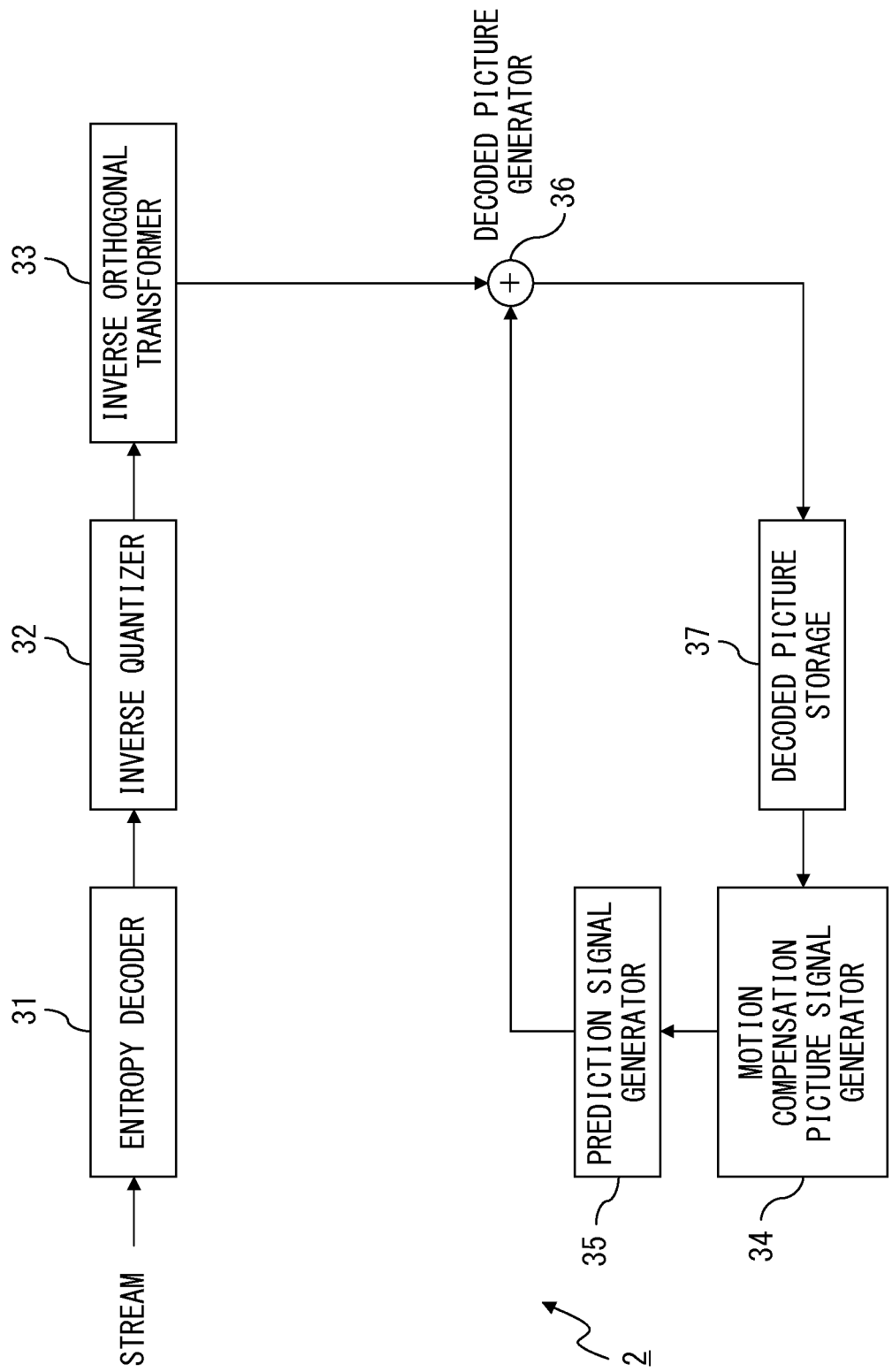
FIG. 2 illustrates a configuration of a video decoder according to an embodiment.

FIG. 2 illustrates a configuration of a video decoder according to an embodiment. A video decoder 2 illustrated in FIG. 2 includes an entropy decoder 31, an inverse quantizer 32, an inverse orthogonal transformer 33, a motion compensation picture signal generator 34, a prediction signal generator 35, a decoded picture generator 36, and a decoded picture storage 37. The video decoder 2 decodes encoded information generated by the video encoder 1 illustrated in FIG. 1, and reproduces the picture.

The entropy decoder 31, the inverse quantizer 32, and the inverse orthogonal transformer 33 perform processes corresponding to those performed by the entropy encoder 14, the quantizer 13, and the orthogonal transformer 12 illustrated in FIG. 1, respectively. Thus, a prediction error signal is reproduced from a received data stream.

The motion compensation picture signal generator 34 generates a motion-compensation picture signal by using a reference picture stored in the decoded picture storage 37 and a motion vector received from the encoder. The prediction signal generator 35 generates, in accordance with the motion-compensation picture signal, a prediction signal representing the predicted value of a decoded picture. The motion compensation picture signal generator 34 and the prediction signal generator 35 generate the prediction signal using substantially the same method as that performed by the motion compensation picture signal generator 19 and the prediction signal generator 20 illustrated in FIG. 1.

The decoded picture generator 36 adds, to a prediction signal generated by the prediction signal generator 35, a signal output from the inverse orthogonal transformer 33 (i.e., a reproduced prediction error signal) so as to generate a decoded picture. The generated decoded picture is stored in the decoded picture storage 37 as a reference picture to be used in subsequent decoding processes.

<Encoding/Decoding of Embodiments>

FIG. 3 explains bi-directional prediction. In bi-directional prediction (or bi-predictive), a forward reference picture and a backward reference picture are used. A forward reference picture (forward motion compensation picture) is selected from among a plurality of reference pictures displayed prior to an encoding target picture. Similarly, a backward reference picture (backward motion compensation picture) is selected from among a plurality of reference pictures displayed posterior to the encoding target picture.

A forward prediction block is the picture block that is the most similar to the encoding target block in the forward reference picture. A forward motion vector represents "motion" between the encoding target block and a forward prediction block. Further, a forward motion-compensation picture signal representing the image of a forward prediction block is generated. Similarly, a backward prediction block is the picture block that is the most similar to the encoding target block in the backward reference picture. A backward motion vector represents "motion" between the encoding target block and a backward prediction block. Further, a backward motion-compensation picture signal representing the image of a backward prediction block is generated. Note that a picture represented by a forward motion compensation picture signal may be referred to as a "predicted picture 0" and a picture represented by a backward motion compensation picture signal may be referred to as a "predicted picture 1" in the following explanations.

The prediction signal of an encoding target signal is generated by calculating the average between the forward motion-compensation picture signal and the backward motion-compensation picture signal. In other words, the prediction signal is generated by calculating the average between the pixel values of predicted pictures 0 and 1 for each pixel. Then, a prediction error signal representing the difference between the encoding target signal and the prediction signal, forward motion vector information, and backward motion vector information are encoded. Although FIG. 3 depicts an adder to add predicted pictures 0 and 1 to each other, the resultant value is divided by two in an actual configuration. Also, according to H.264, two motion compensation pictures are generated from a plurality of arbitrary reference pictures, and those two motion compensation pictures are weighted and added to each other so that the resultant value is used as a B-picture-predicted picture.

FIG. 4 explains a correlation between a prediction error signal and an inter motion-compensation-signal difference signal. In the example illustrated in FIG. 4, square object X is rotating in the clockwise direction. In this example, the encoding target picture at time t is encoded by using the forward reference picture at time t−1 and the backward reference picture at time t+1. Additionally, the forward motion vector and the backward motion vector are both zero in this example. Also, pixel values in the region occupied by object X are assumed to be 100, and pixel values in the background regions are assumed to be zero. Pixel values are, for example, luminance levels, although the scope of the present invention is not limited to this example.

As a forward motion compensation block, the region having the smallest difference from the encoding target block is selected in the forward reference picture. However, because object X is rotating, an image that is completely the same as the image in the encoding target block is not detected in the forward reference picture. In other words, in the forward reference picture, a picture block having a slight difference from the encoding target block is extracted. Similarly, in the backward reference picture, a picture block having a slight difference from the encoding target block is extracted.

As explained in FIG. 3, the prediction signal is generated by averaging the values of predicted pictures 0 and 1 for each pixel. In such a case, the pixel value of each pixel of the prediction signal is "100" in the region where object X exists in both of the predicted pictures 0 and 1, is "50" in the region where object X exists in only one of the predicted pictures 0 and 1, and is "0" in the region where the image is background in both of predicted images 0 and 1.

The prediction signal is subtracted from the encoding target signal for each pixel, thus a prediction error signal is generated. This prediction error signal has, as illustrated in FIG. 4, pixels with pixel value of "50" and pixels with pixel value of "−50" along the boundary portion between object X and the background in the encoding target picture.

Here, the difference between predicted pictures 0 and is discussed. The inter motion-compensation-signal difference signal representing the difference between predicted pictures 0 and 1 (or the difference between a forward motion compensation picture signal and a backward motion compensation picture signal) is obtained by calculating the absolute value of difference between predicted pictures 0 and 1 for each pixel. Accordingly, the intermotion-compensation-signal difference signal has pixels with pixel values 100 along the boundary portion between object X and the background in an encoding target picture as illustrated in FIG. 4.

When the prediction error signal and the inter motion-compensation-signal difference signal are compared, they have approximately the same shape as the regions with pixel values other than zero. In other words, a prediction error exists in a region where predicted pictures 0 and 1 have pixel values different from each other. Accordingly, there is a high correlation between the distribution of a pixel values of the inter motion-compensation-signal difference signal and the distribution of pixel values of the prediction error signal.

In the encoder illustrated in FIG. 1, a prediction error signal is orthogonally transformed, and thereafter is transformed into run-level information by using zigzag scan. The run-level information is encoded by the entropy encoder 14. The entropy encoder 14 is provided with a plurality of entropy code tables. The run-level information is encoded by utilizing one of the plurality of entropy code tables. When the entropy encoder 14 selects an appropriate entropy code table, the information amount of encoded information is reduced. Note that the appropriate entropy code table is selected according to contents (the number of non-zero coefficients for example) of the run-level information to be encoded.

As was explained above, there is a high correlation between a prediction error signal and an inter motion-compensation-signal difference signal. Therefore, there is a correlation between contents of the run-level information of the prediction error signal and contents of the run-level information of the inter motion-compensation-signal difference signal.

In an encoding method according to the embodiment, the above correlation (between prediction error signal and the inter motion-compensation-signal difference signal) is utilized in order to reduce the information amount of encoded data. In other words, run-level information of the inter motion-compensation-signal difference signal is obtained instead of run-level information of the prediction error signal, and an entropy code table is selected in accordance with contents of the run-level information of the inter motion-compensation-signal difference signal. Then, the entropy encoder 14 encodes the prediction error signal using the selected entropy code table. By so doing, the amount of the entropy encoded data is reduced.

Figure 5:
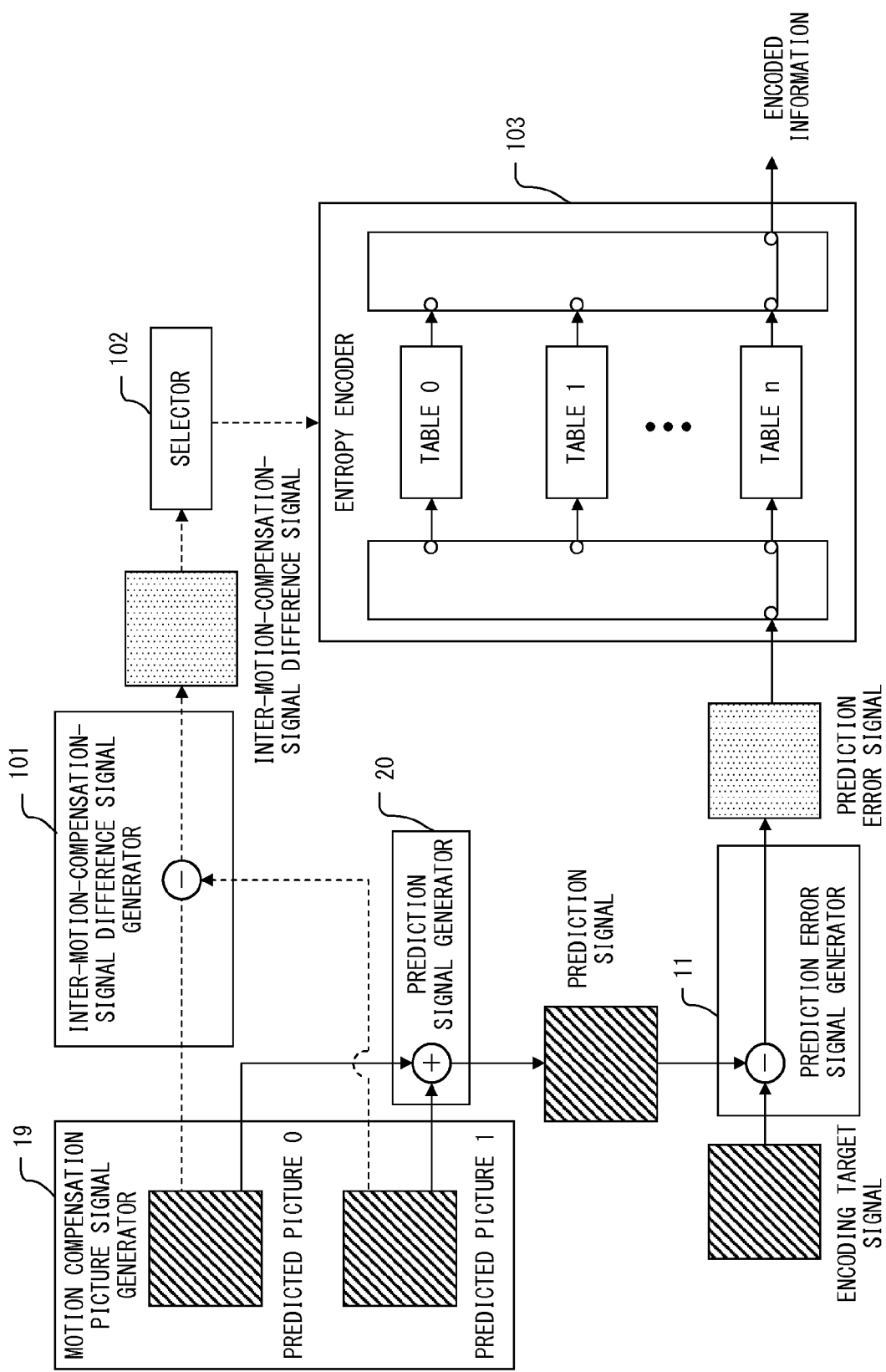
FIG. 5 explains an outline of an encoding method according to an embodiment.

FIG. 5 explains an outline of an encoding method according to an embodiment. In this example, it is assumed that the motion compensation picture signal generator 19 has selected predicted pictures 0 and 1 that constitute a pair of motion compensation picture signals by using bi-directional prediction. Predicted pictures 0 and 1 are, for example, a forward reference picture and a backward reference picture, respectively.

The prediction signal generator 20 generates a prediction signal by, for example, calculating the average between predicted pictures 0 and 1 although this example is not limiting the scope of the invention. In such a case, "(predicted picture 0+predicted picture 1)/2" is calculated for the pixel value of each pixel. Also, the prediction error signal generator 11 generates a prediction error signal that represents the difference between an encoding target signal and the prediction signal. In such a case, "encoding target signal−prediction signal" is calculated for each pixel.

An inter motion-compensation-signal difference signal generator 101 generates an inter motion-compensation-signal difference signal that represents the difference between predicted pictures 0 and 1. For this generation, the inter motion-compensation-signal difference signal generator 101 calculates, for example, "predicted picture 0—predicted picture 1" for the pixel value of each pixel in order to generate an inter motion-compensation-signal difference signal.

A selector 102 selects, in accordance with the characteristic amount of the inter motion-compensation-signal difference signal, an entropy code assignment rule that is expected to minimize the information amount of the encoded state of the prediction error signal from among a plurality of entropy code assignment rules prepared for generating encoded information from the prediction error signal. As was explained by referring to FIG. 4, there is a high correlation between the prediction error signal and the inter motion-compensation-signal difference signal. Thus, the selector 102 can detect the characteristic of the prediction error signal by referring to the inter motion-compensation-signal difference signal without directly referring to the prediction error signal. Accordingly, the selector 102 can select an entropy code assignment rule optimum or favorable for the characteristic of the prediction error signal by referring to the inter motion-compensation-signal difference signal.

An entropy encoder 103 provides a plurality of entropy code assignment rules for encoding the prediction error signal. Each of the entropy code assignment rules is implemented, in this example, by an entropy code table for defining correspondence relationships between input information and cord words. In the example illustrated in FIG. 5, the entropy encoder 103 is provided with tables #0 through #n in order to provide a plurality of entropy code assignment rules.

FIGS. 6A through 6D illustrate examples of entropy code tables. In these examples, the entropy encoder 103 includes tables #0 through #5, of which tables #4 and #5 are used for encoding the DC values of color difference signal, and thus are not directly related to an encoding method according to an embodiment. Note that the entropy code tables illustrated in FIGS. 6A through 6D are defined by CAVLC (Context-based Adaptive Variable Length Coding) of H.264. In addition, an entropy code table is also referred to as a VLC (Variable Length Coding) table.

In entropy encoding of a prediction error signal, when an entropy code table is appropriately selected in accordance with the characteristic of that prediction error signal, the information amount of encoded information is efficiently reduced. For example, when an entropy code table is selected in accordance with the number of non-zero coefficients included in a plurality of orthogonal transform coefficients representing prediction error signals, the information amount of encoded information is efficiently reduced. However, since the prediction error signal is reproduced by entropy decoding in a decoder, a table for entropy decoding cannot be selected in accordance with the characteristic of the prediction error signal. In other words, according to this method, the decoder cannot select a corresponding table with respect to the entropy code table selected in the encoder.

When a prediction error signal of an encoding target block is estimated from images of adjacent blocks of the encoding target block so as to select an entropy code table in accordance with the estimated prediction error signal, it may be possible for the encoder and the decoder to use identical entropy code. However, according to this method, when there is a great difference in image between an encoding target block and adjacent blocks (such as in a region having fine textures for example), an appropriate entropy code table is not selected and the information amount of encoded information is not reduced.

Accordingly, in an encoding method according to an embodiment, the selector 102 selects one of tables #0 through #n in accordance with an inter motion-compensation-signal difference signal. The selector 102 adaptively selects an entropy code table that is expected to minimize the information amount of the encoded state of a prediction error signal (i.e., the information amount of data output from the entropy encoder 103). Then, the entropy encoder 103 encodes the prediction error signal by utilizing the selected entropy code table. It is assumed for example that the selector 102 has selected table #1 on the entropy code tables illustrated in FIGS. 6A through 6D. It is also assumed that "TrailingOnes=0" and "TotalCoeff=1" are obtained in the run-level information representing the prediction error signal to be encoded. In such a case, the entropy encoder 103 extracts "001011" from table #1 and outputs the value as encoded information corresponding to the prediction error signal. "TrailingOnes" and "TotalCoeff" will be explained in detail later.

There is a high correlation between the prediction error signal and the inter motion-compensation-signal difference signal. In other words, when an entropy code table that minimizes the information amount of the encoded state of the inter motion-compensation-signal difference signal is used for entropy encoding, the information amount of the encoded information of the prediction error signal is reduced. Accordingly, when an entropy code table selected in the above method is used for entropy encoding, the information amount of the encoded information of the prediction error signal is small. Also, in the encoding method according to the embodiment, the information amount of the encoded information of the prediction error signal is small even when there is a large difference in image between an encoding target block and an adjacent block because an entropy code table is selected in accordance with the inter motion-compensation-signal difference signal generated for the encoding target block.

Figure 7:
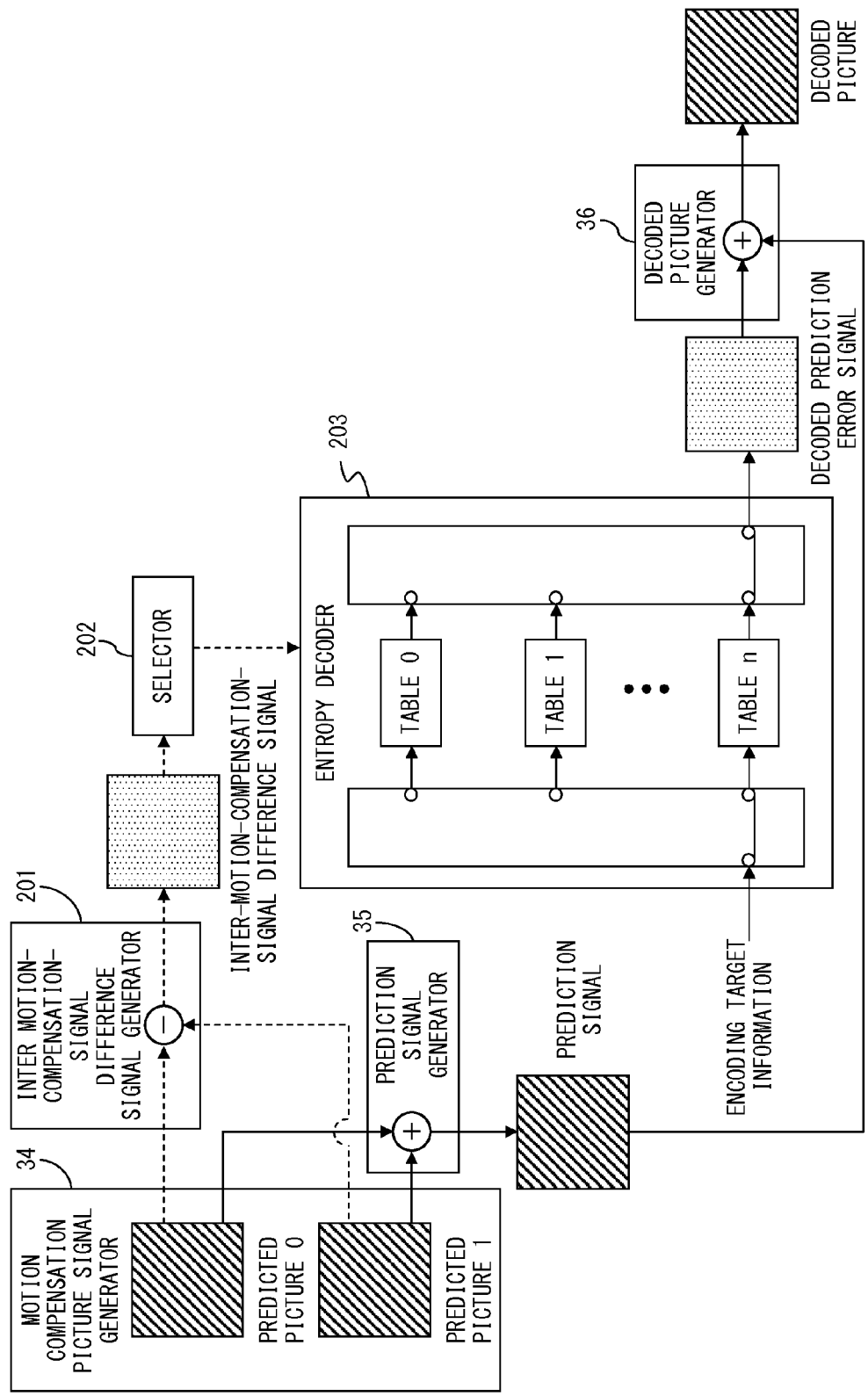
FIG. 7 explains an outline of a decoding method according to an embodiment.

FIG. 7 explains an outline of a decoding method according to an embodiment. It is assumed in this example that the motion compensation picture signal generator 34 has selected predicted pictures 0 and 1 that constitute a pair of motion compensation picture signals using bi-directional prediction. Predicted pictures 0 and 1 are generated in accordance with a reference picture that has been decoded priorly. The reference pictures are substantially the same as the reference pictures used by the encoder illustrated in FIG. 5. Accordingly, the decoder can generate predicted pictures 0 and 1 that are substantially the same as those generated by the encoder.

Similarly to the prediction signal generator 20 included in the encoder illustrated in FIG. 5, the prediction signal generator 35 calculates the average between predicted pictures 0 and 1, and thereby generates a prediction signal. This prediction signal is transmitted to the decoded picture generator 36.

An inter motion-compensation-signal difference signal generator 201 generates an inter motion-compensation-signal difference signal representing the difference between predicted pictures 0 and 1. A selector 202 selects, in accordance with the characteristic of the inter motion-compensation-signal difference signal, an entropy code table that is expected to minimize the information amount of encoded state of a prediction error signal. At this time, the selector 202 selects one of a plurality of entropy code tables #0 through #n included in an entropy decoder 203.

The inter motion-compensation-signal difference signal generator 201 and the selector 202 perform substantially the same operations as those performed by the inter motion-compensation-signal difference signal generator 101 and the selector 102 included in the encoder illustrated in FIG. 5. Accordingly, the selector 202 can select the same table as the entropy code table selected by the encoder.

The entropy decoder 203 decodes decoding target information by using the entropy code table selected by the selector 202 so as to reproduce a prediction error signal. In this example, the decoding target information is generated by the encoder illustrated in FIG. 5. Decoding processes performed by the entropy decoder 203 are implemented by performing the inverse processes of encoding processes performed by the entropy encoder 103 in the encoder.

The decoded picture generator 36 adds, to the prediction signal generated by the prediction signal generator 35, the prediction error signal output from the entropy decoder 203. Thereby, a decoded picture is generated.

As has been described, the decoder selects, similarly to the encoder, an entropy code table in accordance with the difference between two predicted pictures. Pictures referred to by the encoder and the decoder in order to generate predicted pictures are substantially the same to each other. In other words, the encoder and the decoder an generate substantially the same inter motion-compensation-signal difference signals independently from each other. Accordingly, in encoding/decoding methods according to an embodiment, the encoder and the decoder can select the same entropy code words to each other without transmitting information specifying an entropy code table (or an entropy code word) from the encoder to the decoder.

It is also possible to employ a configuration in which the encoder transmits information specifying an entropy code table to the decoder. In that configuration, the decoder does not have to perform a process of selecting an entropy code table. However, that configuration increases the information amount of data transmitted from the encoder to the decoder, and thus the total efficiency in encoding/decoding is not necessarily improved.

As has been described above, video encoding/decoding methods according to an embodiment utilize correlations between the distribution of difference values between a plurality of motion-compensation picture signals and the distribution of a prediction error signal. In other words, an entropy code table for encoding a prediction error signal is selected appropriately in accordance with the distribution of difference values between motion-compensation picture signals. Accordingly, the encoding/decoding method of an embodiment reduces the information amount of encoded information compared with conventional methods (for example, a method that uses images of adjacent blocks in the same picture). In addition, according to the method of an embodiment, the information amount of the encoded information of the prediction error signal is small even when there are great differences in image between an encoding target block and adjacent blocks.

<First Embodiment>

Figure 8:
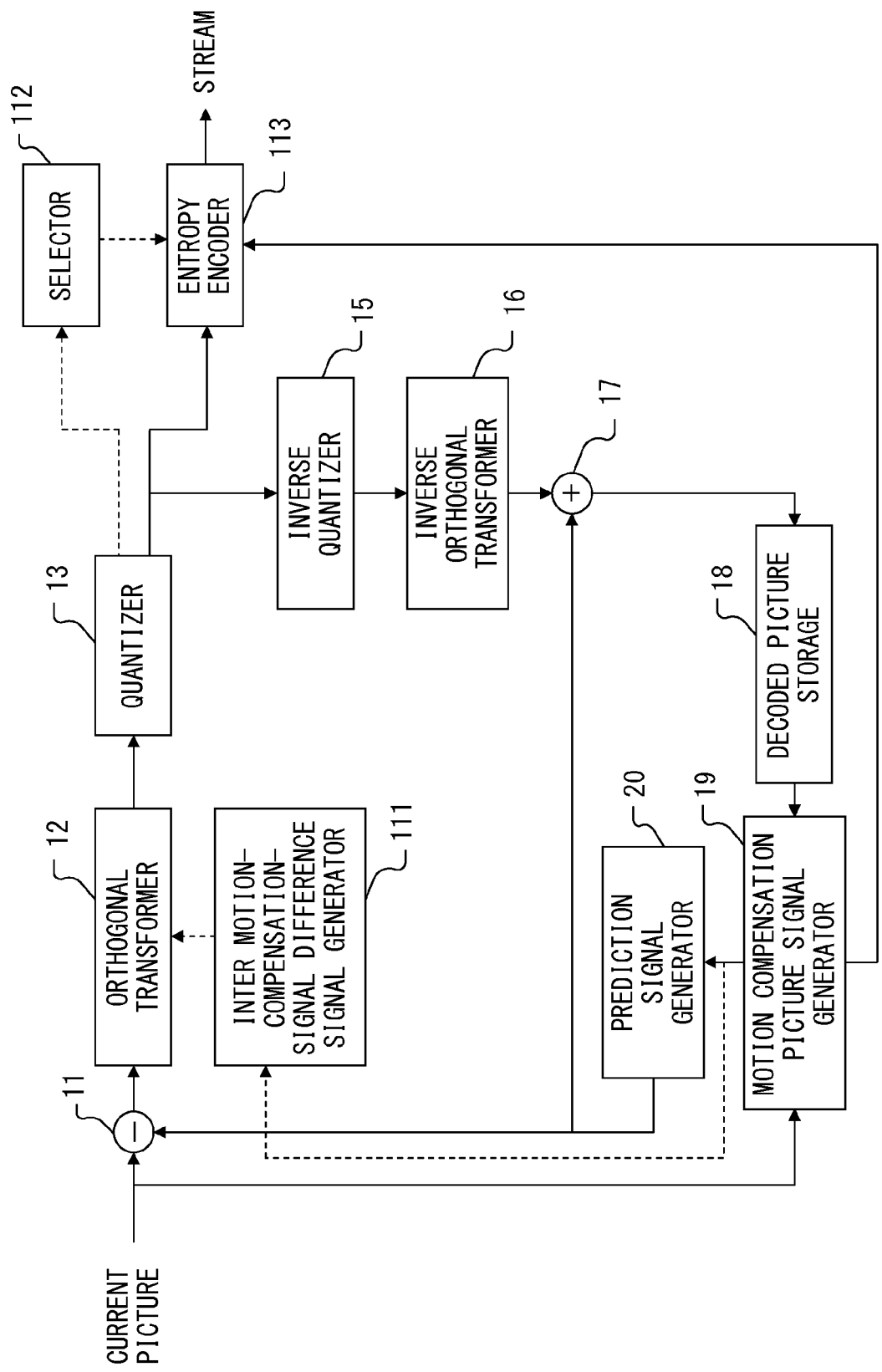
FIG. 8 illustrates a configuration of an encoder according to a first embodiment.

FIG. 8 illustrates a configuration of an encoder according to a first embodiment. The encoder according to the first embodiment includes the prediction error signal generator 11, the orthogonal transformer 12, the quantizer 13, the inverse quantizer 15, the inverse orthogonal transformer 16, the decoded picture generator 17, the decoded picture storage 18, the motion compensation picture signal generator 19, the prediction signal generator 20, an inter motion-compensation-signal difference signal generator 111, a selector 112, and an entropy encoder 113. The prediction error signal generator 11, the orthogonal transformer 12, the quantizer 13, the inverse quantizer 15, the inverse orthogonal transformer 16, the decoded picture generator 17, the decoded picture storage 18, the motion compensation picture signal generator 19, and the prediction signal generator 20 are substantially the same as those explained by referring to FIG. 1. Also, the inter motion-compensation-signal difference signal generator 111, the selector 112, and the entropy encoder 113 correspond to the inter motion-compensation-signal difference signal generator 101, the selector 102, and the entropy encoder 103 illustrated in FIG. 5, respectively.

First, explanations will be given to processes of determining an entropy code table. In the explanations below, it is assumed that the motion compensation picture signal generator 19 calculates two motion vectors and two motion compensation pictures (predicted pictures 0 and 1 illustrated in FIG. 5) are selected.

The inter motion-compensation-signal difference signal generator 111 generates an inter motion-compensation-signal difference signal representing the difference between motion compensation picture signals generated by the motion compensation picture signal generator 19. This inter motion-compensation-signal difference signal is fed to the orthogonal transformer 12. The orthogonal transformer 12 performs an orthogonal transform process on the inter motion-compensation-signal difference signal. This orthogonal transform process generates an inter motion-compensation-signal difference signal having its frequency components separated into the horizontal direction and the vertical direction. The quantizer 13 quantizes a signal output from the orthogonal transformer 12. The inter motion-compensation-signal difference signal output from the quantizer 13 is represented by a plurality of orthogonal transform coefficients. For example, when an encoding target block is of 4×4 pixels, the inter motion-compensation-signal difference signal is represented by 16 orthogonal transform coefficients.

The selector 112 detects, from the inter motion-compensation-signal difference signal output from the quantizer 13 (i.e., a plurality of orthogonal transform coefficients), the number of orthogonal transform coefficients having values that are not zero. Note that an "orthogonal transform coefficient having a value that is not zero" may also be referred to as a "non-zero coefficient", and the number of non-zero coefficients detected from the inter motion-compensation-signal difference signal may also be referred to as "nP" in the explanations below. The selector 112 selects a table corresponding to the number "np" from among entropy code tables #0 through #3 illustrated in FIG. 6A through 6D. Table #0 is selected when "0≤nP<2" is satisfied. Similarly, table #1 is selected when "2≤nP<4" is satisfied, table #2 is selected when "4≤nP<8" is satisfied, and table #3 is selected when "8≤nP" is satisfied. The selector 112 reports the selection result to the entropy encoder 113.

Next, explanations will be given to processes of encoding an encoding target signal. First, the prediction error signal generator 11 generates a prediction error signal that represents the difference between the encoding target signal and the prediction signal. The encoding target signal represents block data obtained by dividing the current picture of input picture data. A block is, for example, a macro block with the size of 16×16 pixels although this example is not limiting the scope of the invention. The prediction signal represents block data of a predicted picture, and is generated from a forward motion compensation block and a backward motion compensation block in bi-directional prediction.

The orthogonal transformer 12 performs an orthogonal transform process on the prediction error signal. This orthogonal transform process generates a prediction error signal having its frequency components separated into the horizontal direction and the vertical direction. Next, the quantizer 13 quantizes a signal output from the orthogonal transformer 12. A signal output from the quantizer 13 is provided to the entropy encoder 113 and the inverse quantizer 15.

The entropy encoder 113 performs zigzag scan on the prediction error signal in order to generate run-level information. When this zigzag scan is performed, the entropy encoder 113 has already received a report about the entropy code table selected by the selector 112. Then, the entropy encoder 113 encodes the run-level information of the prediction error signal using the entropy code table selected by the selector 112. In entropy encoding, a corresponding code is assigned in accordance with the appearance frequency of symbols. The entropy encoder 113 may encode other information (motion vector information and the like, for example).

The inverse quantizer 15 performs inverse quantization on a signal output from the quantizer 13. The inverse orthogonal transformer 16 performs an inverse orthogonal transform on a signal output from the inverse quantizer 15. The inverse quantizer 15 and the inverse orthogonal transformer 16 perform processes corresponding to the quantizer 13 and the orthogonal transformer 12, respectively. Accordingly, a prediction error signal is reproduced by the inverse quantizer 15 and the inverse orthogonal transformer 16. However, the reproduced prediction error signal does not necessarily correspond completely to the prediction error signal output from the prediction error signal generator 11.

The decoded picture generator 17 adds the reproduced prediction error signal to the prediction signal generated by the prediction signal generator 20, and thereby reproduces block data of the current picture. The decoded picture storage 18 stores, as reference picture data, the block data generated by the decoded picture generator 17.

The motion compensation picture signal generator 19 obtains a motion vector by using the block data of the current picture and the block data of a reference picture stored in the decoded picture storage 18. The motion vector is calculated, for example, by using a block matching technique, which searches for the position of the block in the reference picture that is the most similar to the encoding target block in the current picture. The prediction signal generator 20 performs motion compensation using the calculated motion vector so as to generate block data of a motion-compensated reference picture. This block data is provided to the prediction error signal generator 11.

As has been described above, in the encoder according to the first embodiment, an entropy code table that minimizes the information amount of encoded information is selected in accordance with the number of non-zero coefficients in a plurality of orthogonal transform coefficients representing an inter motion-compensation-signal difference signal. The entropy encoder encodes the prediction error signal by using the selected entropy code table. There is a high correlation between the inter motion-compensation-signal difference signal and the prediction error signal. In other words, an entropy code word that reduces the information amount of the encoded information of then inter motion-compensation-signal difference signal also reduces the information amount of the encoded information of the prediction error signal. Thus, when the prediction error signal is encoded using the entropy code table selected in the above method, the information amount of the encoded state of the prediction error signal is reduced.

Next, detailed explanations will be given to an encoding method according to the first embodiment. It is assumed in the explanations below that CAVLC of H.264 is employed as an encoding method.

In CAVLC, a plurality of orthogonal transform coefficients generated through an orthogonal transform such as a DCT or the like and quantization are transformed into 1-dimensional vector (i.e., 1-dimensional coefficient sequence or 1-dimensioanl array) through zigzag scan. This coefficient sequence is transformed into run-level information including the following information.

TotalCoeff: Information representing the number of non-zero coefficients

Figure 9:
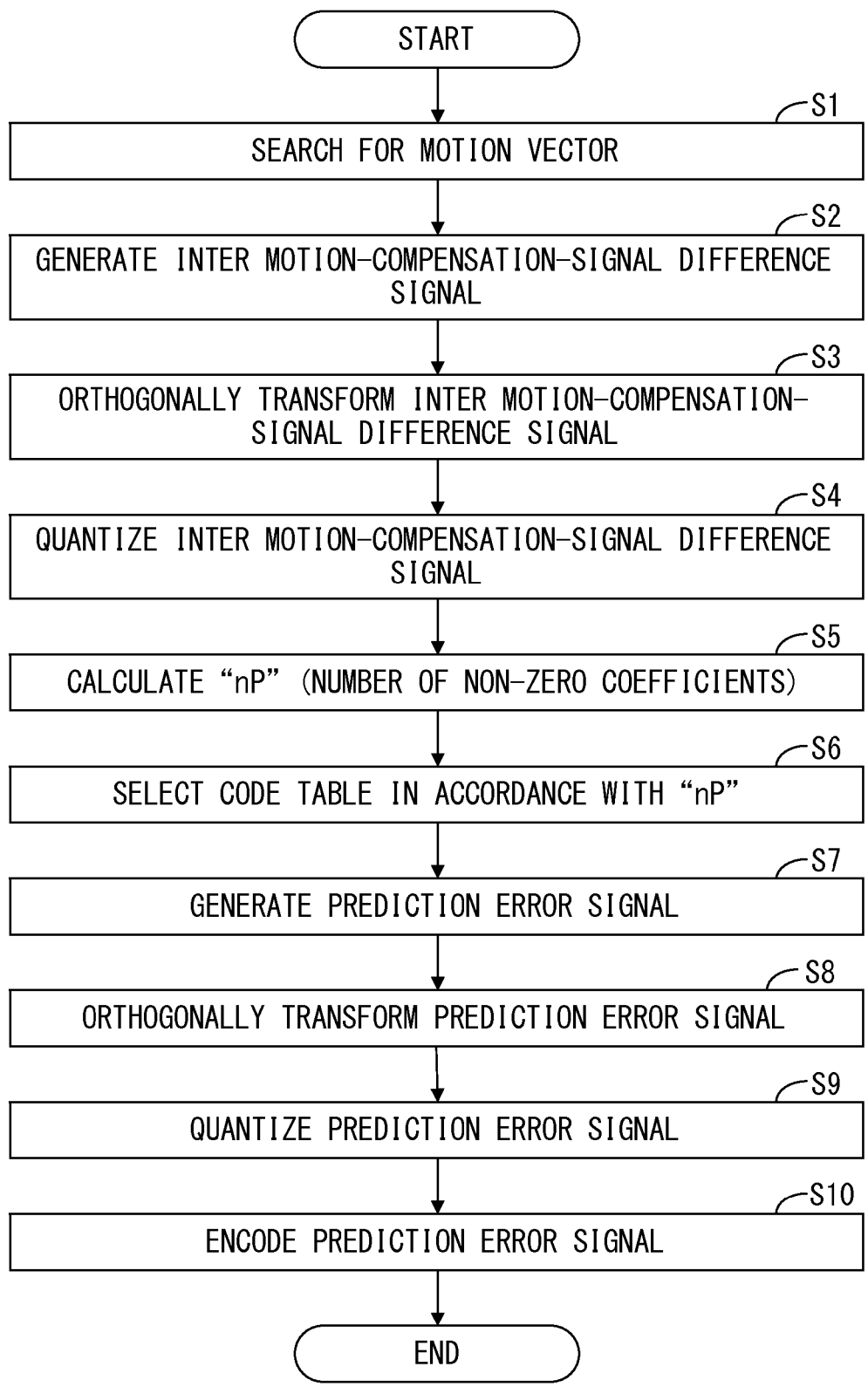
FIG. 9 is a flowchart explaining an encoding method according to the first embodiment.

TrailingOnes: Information representing the number of coefficients having "1" as absolute values that continue in the last portion of the coefficient sequence Trailing_ones_sign_flag: Information representing the signs (+ or −) of coefficients having "1" as absolute values that continue in the last portion of the coefficient sequence Level: Information representing a value of a quantized orthogonal transform coefficient total_zeros: Information representing the number of zero coefficients existing before the last non-zero coefficient run_before: Information representing the number of zeros that continue before non-zero coefficients FIG. 9 is a flowchart explaining the encoding method according to the first embodiment. The processes of this flowchart are executed for each encoding target block.

In step S1, the motion compensation picture signal generator 19 performs block matching between the encoding target signal and a reference picture stored in the decoded picture storage 18. The block matching selects a motion vector that minimizes the sum of absolute difference "SAD" of the pixel values for coordinates (x, y) in the block between encoding target signal "CurrentPic" and the reference picture "RefPic" as expressed by, for example, expression (1) where "CurrentPic_Pixel" a represents a pixel constituting the encoding target signal, and RefPic_Pixel represents a pixel constituting the reference picture. In the encoding method according to the embodiment, a bi-directional motion vector search has to be conducted. Thus, in step S1, two motion vectors MV0 and MV1 are selected using two reference pictures Ref0 and Ref1.

$$SAD = \sum_{x,y} |CurrentPic\_Pixel(x, y) - RefPic\_Pixel(x, y)| \quad (1)$$

In step S2, the motion compensation picture signal generator 19 obtains predicted pictures (motion compensation pictures) Pred0 and Pred1 specified by motion vectors MV0 and MV1, respectively. The inter motion-compensation-signal difference signal generator 111 calculates difference "predDiff_Pixel" between the motion compensation signals using expression (2) where Pred0_pixel represents a pixel constituting predicted picture Pred0, and Pred1_Pixel represents a pixel constituting predicted picture Pred1. In other words the difference between pixel values at coordinates (x, y) in the predicted pictures are calculated.

$$PredDiff\_Pixel(x,y)=Pred0\_Pixel(x,y)-Pred1\_Pixel(x,y) \quad (2)$$

In step S3, the orthogonal transformer 12 performs an orthogonal transform on inter motion-compensation-signal difference signal PredDiff_Pixel. The orthogonal transform is, for example, a two-dimensional DCT in MPEG-2, and is an integer DCT in H.264. A Hadamard transform or the like may also be used as a simpler transform. A calculation example of DCT is provided as expression (3) where u and v represent the coordinates of the frequency domain.

$$PredDiff(u, v) = \frac{1}{4}C(u)C(v) \quad (3)$$

$$\sum_{x,y} PredDiff\_Pixel(x, y)\cos\left(\frac{(2x + 1)u\pi}{16}\right)\cos\left(\frac{(2y + 1)v\pi}{16}\right)$$

$$C(u), C(v) = \begin{cases} 1/\sqrt{2} \ (u = 0 \ or \ v = 0) \\ 1(u \neq 0, v \neq 0) \end{cases}$$

In step S4, the quantizer 13 quantizes the inter motion-compensation-signal difference signal PredDiff that has already received an orthogonal transform with a specified quantization step size Q. Thereby, "PredDiff/Q" is generated. An inter motion-compensation-signal difference signal output from the quantizer 13 is expressed by a plurality of quantized orthogonal transform coefficients. For example, when an encoding target block is of 4×4 pixels, output of the quantizer 13 is expressed by 16 orthogonal transform coefficients.

Figure 10:
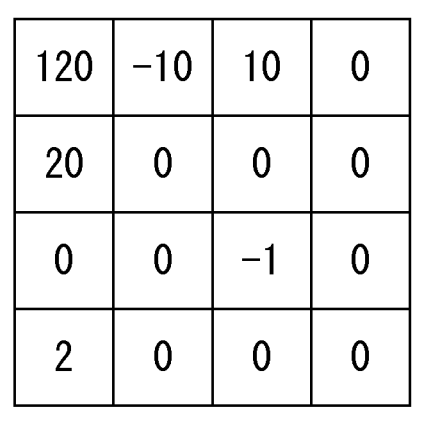

In step S5, the selector 112 detects the number "np" of non-zero coefficients in a plurality of orthogonal transform coefficients representing an inter motion-compensation-signal difference signal. As an example, it is assumed that the inter motion-compensation-signal difference signal illustrated in FIG. 10 is output from the quantizer 13. In this example, the inter motion-compensation-signal difference signal includes six non-zero coefficients, "120", "−10", "10", "20", "−1", and "2". Accordingly, "nP=6" is detected.

In step S6, the selector 112 selects an entropy code table in accordance with detected number "nP" of non-zero coefficients. In this example, the entropy encoder 113 includes tables #0 through #3 defined by H.264 and illustrated in FIGS. 6A through 6D. Under this condition, the selector 112 selects table #2 in accordance with "nP=6" from among tables #0 through #3. The selected entropy code table is set in the entropy encoder 113. The entropy encoder 113 may include a table that defines a different entropy code assignment rule instead of including a table used by H.264.

In step S7, the prediction signal generator 20 performs bi-directional prediction. Prediction signal BiPredPic of bi-directional prediction is usually represented by the average of the pixel values of predicted pictures Pred0 and Pred1. In other words, "(Pred0+Pred1)/2)" is calculated. Further, the prediction error signal generator 11 calculates, as expressed by expression (4), prediction error signal CurrDiff_Pixel that represent the differences between pixels at coordinates (x, y) between encoding target signal CurrentPic and prediction signal BiPredPic for all pixels.

$$CurrDiff\_Pixel(x,y)=CurrPic\_Pixel(x,y)-BiPredPic\_Pixel(x,y) \quad (4)$$

In expression (4) above, CurrPic_pixel represents a pixel constituting an encoding target signal, and BiPredPic_Pixel represents a pixel constituting a bi-directional prediction signal.

In step S8, the orthogonal transformer 12 performs an orthogonal transform on prediction error signal CurrDiff_Pixel in order to obtain orthogonally transformed signal CurrDiff. In step S9, the quantizer 13 quantizes signal CurrDiff with quantization step size Q. Thereby, "CurrDiff/Q" is generated.

Figure 11:
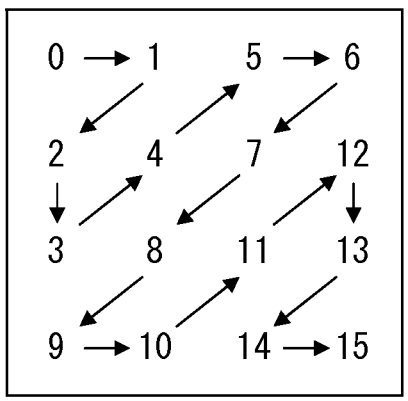
FIGS. 11A-11C illustrate examples of prediction error signals.

In step S10, the entropy encoder 113 encodes a prediction error signal output from the entropy encoder 113. As an example, It is assumed that a prediction error signal illustrated in FIG. 11A is output from the quantizer 13. In this example, a prediction error signal output from the quantizer 13 is represented by a plurality of quantized orthogonal transform coefficients. For example, when an encoding target block is of 4×4 pixels, output from the quantizer 13 is expressed by 16 orthogonal transform coefficients. As described above, there is a correlation between a prediction error signal and an inter motion-compensation-signal difference signal. Accordingly, the distribution of coefficients of prediction error signals illustrated in FIG. 11A is similar to the distribution of coefficients of the inter motion-compensation-signal difference signal illustrated in FIG. 10.

The entropy encoder 113 performs zigzag scan on the prediction error signal illustrated in FIG. 11A in order to generate a one-dimensional coefficient sequence. The pattern illustrated in FIG. 11B is employed for the zigzag scan in this example although this example is not limiting the scope of the invention. By so doing, the coefficient sequence illustrated in FIG. 11C is obtained.

Next, the entropy encoder 113 generates run-level information from the coefficient sequence obtained through the zigzag scan. In the example illustrated in FIG. 11C, run-level information as described below is generated.
TotalCoeff: 6
TrailingOnes: 2
Trailing_ones_sign_flag: −, +
level: 100, −20, 10, 5
total_zeros: 6
run_before: 2, 3, 1

The entropy encoder 113 encodes run-level information by using the entropy code table selected by the selector 112. In this example, table #2 illustrated in FIGS. 6A through 6D has been selected by the selector 112. Also, as run-level information representing the prediction error signal, "TrailingOnes=2" and "TotalCoeff=6" have been obtained. Accordingly, code word "001101" corresponding to the combination of "TrailingOnes=2" and "TotalCoeff=6" is extracted. The entropy encoder 113 outputs the above extracted code word as information representing TrailingOnes and TotalCoeff of the prediction error signal. Also, together with the above code word, the entropy encoder 113 may encode and output other information.

Note that the order of executing the respective steps illustrated in FIG. 9 is just one of examples, and the scope of the invention is not limited to this execution order. In other words, steps S7 through S9 may be executed before the detection of non-zero coefficients of an inter motion-compensation-signal difference signal, or may be executed in parallel with steps S2 through S6.

Figure 12:
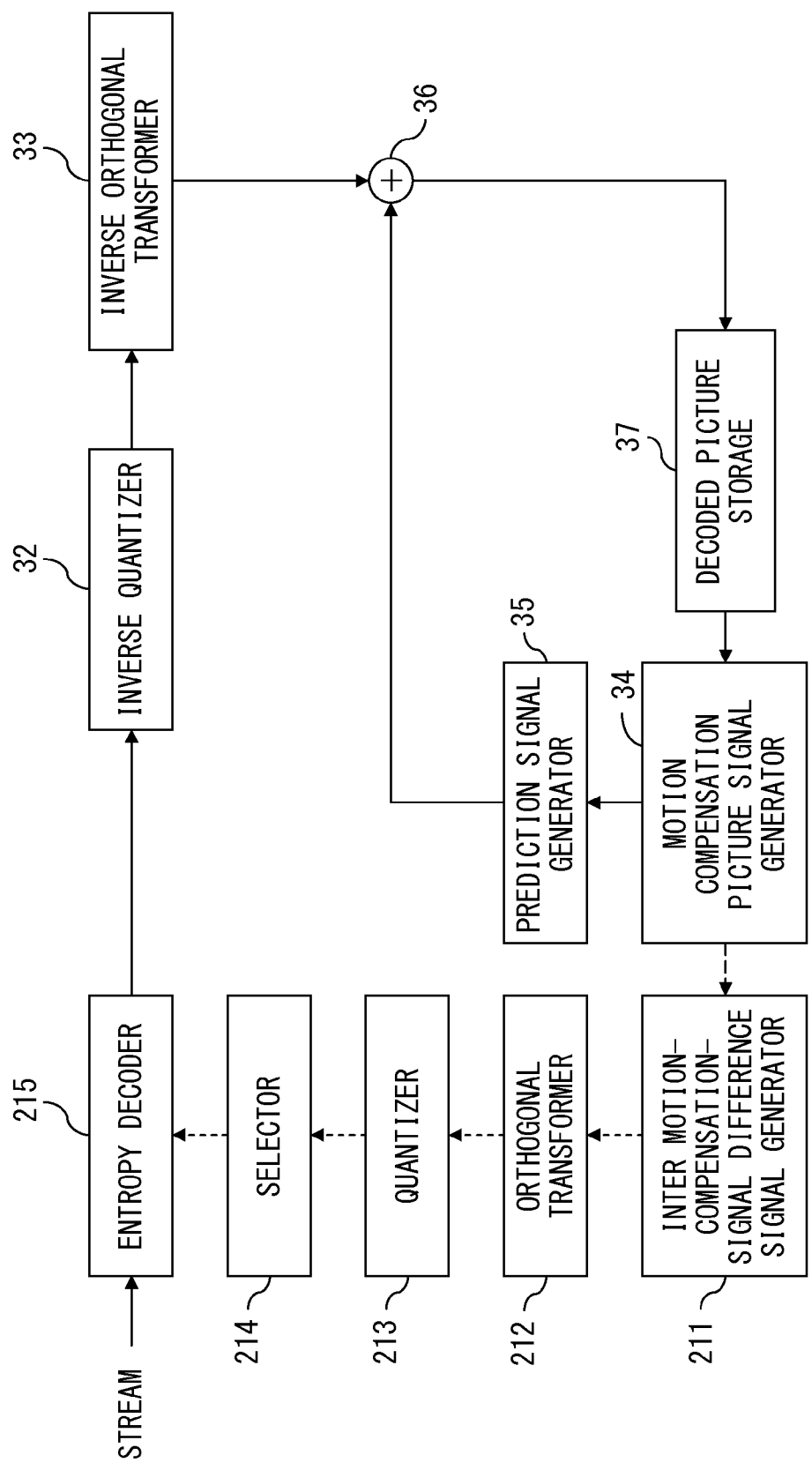
FIG. 12 illustrates a configuration of a decoder according to the first embodiment.

FIG. 12 illustrates a configuration of a decoder according to the first embodiment. The decoder according to the first embodiment includes the inverse quantizer 32, the inverse orthogonal transformer 33, the motion compensation picture signal generator 34, the prediction signal generator 35, the decoded picture generator 36, the decoded picture storage 37, an inter motion-compensation-signal difference signal generator 211, an orthogonal transformer 212, a quantizer 213, a selector 214, and an entropy decoder 215. The inverse quantizer 32, the inverse orthogonal transformer 33, the motion compensation picture signal generator 34, the prediction signal generator 35, the decoded picture generator 36, and the decoded picture storage 37 are as explained by referring to FIG. 2. Also, the inter motion-compensation-signal difference signal generator 211 and the entropy decoder 215 correspond to the inter motion-compensation-signal difference signal generator 201 and the entropy decoder 203 illustrated in FIG. 7, respectively. Also, the orthogonal transformer 212, the quantizer 213, and the selector 214 correspond to the selector 202 illustrated in FIG. 7.

The inter motion-compensation-signal difference signal generator 211, the orthogonal transformer 212, the quantizer 213, and the selector 214 perform substantially the same operations as those performed by the inter motion-compensation-signal difference signal generator 111, the orthogonal transformer 12, the quantizer 13, and the selector 112 included in the encoder illustrated in FIG. 8. In other words, the decoder also selects an entropy code table in accordance with an inter motion-compensation-signal difference signal. The entropy decoder 215 decodes the decoding target signal using the selected entropy code table in order to reproduce a prediction error signal. The method in which a decoded picture is generated from a prediction signal and a reproduced prediction error signal is as explained by referring to FIG. 2.

FIG. 13 is a flowchart illustrating a decoding method according to the first embodiment. The processes of this flowchart are executed for each decoding target block.

In steps S21 through S23, macro bock type information of bi-directional prediction, quantization step size information, and motion vector information are decoded. In step S24, the motion compensation picture signal generator 34 generates a predicted picture (a motion compensation picture signal) by utilizing information obtained in steps S21 through S23.

In steps S25 through S29, substantially the same operations as performed in steps in S2 through S6 in the encoding method are performed. That is to say, an entropy code table that is expected to minimize the information amount of encoded information is selected in accordance with number "nP" of non-zero coefficients in the inter motion-compensation-signal difference signal.

In step S30, the entropy decoder 215 decodes the decoding target information using the entropy code table selected by the selector 214. In this process, the entropy decoder 215 performs the inverse processes of encoding processes executed by the entropy encoder 113 included in the encoder. For example, run-level information is reproduced from the decoding target information, a coefficient sequence is reproduced from the run-level information, and a plurality of orthogonal transform coefficients representing a prediction error signal is reproduced through inverse zigzag scan on the coefficient sequence.

In step S31, the inverse quantizer 32 inversely quantizes a signal output from the entropy decoder 215. In step S32, the inverse orthogonal transformer 33 reproduces a prediction error signal by performing an inverse orthogonal transform on a signal output from the inverse quantizer 32. In step S33, the prediction signal generator 35 utilizes a predicted picture obtained by the motion compensation picture signal generator 34, and generates a prediction signal. In step S34, the decoded picture generator 36 adds the prediction error signal obtained in step S32 to the prediction signal obtained in step S33, and thereby generates a decoded picture.

Note that the order of executing the respective steps illustrated in FIG. 13 is just one of examples, and the scope of the invention is not limited to this execution order.

<Second Embodiment>

In the first embodiment, an entropy code table is selected in accordance with non-zero coefficients of an inter motion-compensation-signal difference signal. By contrast, in the second embodiment, an entropy code table is selected by referring not only to inter motion-compensation-signal difference signals but also to one or more blocks adjacent to an encoding target block.

Figure 14:
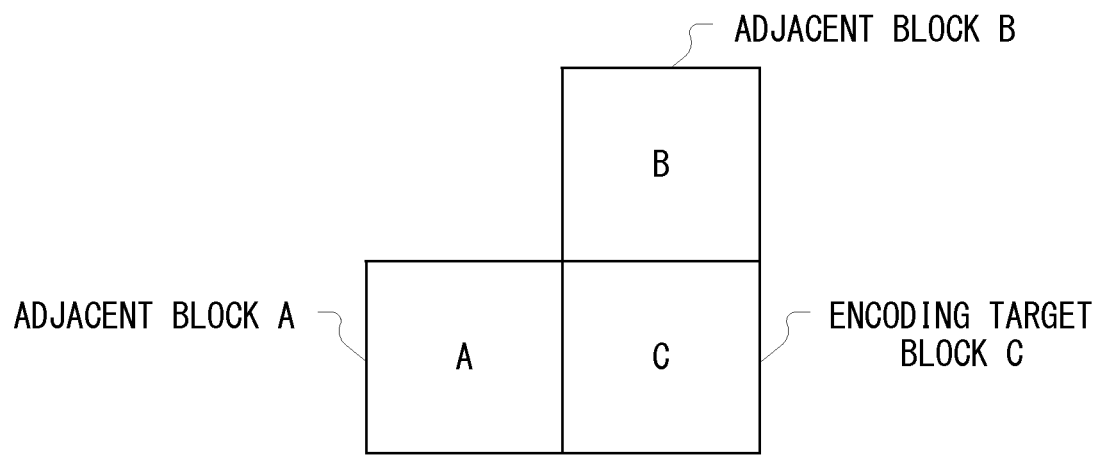
FIG. 14 explains adjacent blocks.

FIG. 14 explains adjacent blocks. In the second embodiment, images of two adjacent blocks A and B are referred to in order to select an entropy code table. Adjacent block A is adjacent to the left side of encoding target block C. Adjacent block B is adjacent to the upper side of encoding target block C. In addition, both blocks A and B receive encoding/decoding prior to encoding target block C.

In the encoding method according to the second embodiment, the selector 102 detects number "nP" of non-zero coefficients of an inter motion-compensation-signal difference signal for encoding target block C. The method for detecting nP may be the same as that used in the first embodiment. The selector 102 also detects numbers "nA" and "nB" of non-zero coefficients of prediction error signals of adjacent blocks A and B, respectively. Each of the prediction error signals of adjacent blocks A and B is represented by a plurality of orthogonal transform coefficients through an orthogonal transform and quantization.

The selector 102 calculates the intermediate value of nA, nB, and nP. Also, the selector 102 selects a corresponding entropy code table from among entropy code tables #0 through #3 illustrated in FIGS. 6A through 6D in accordance with the intermediate value. Then, similarly to the first embodiment, the entropy encoder 103 encodes the run-level information of the prediction error signal using the selected entropy code table. It is also possible for the selector 102 to select an entropy code table in accordance with the average of nA, nB, and nP instead of the intermediate value of nA, nB, and nP.

In the decoding method, the selector 202 selects an entropy code table using substantially the same method as that used by the selector 102 included in the encoder. The entropy decoder 203 decodes decoding target information using the entropy code table selected by the selector 202 in order to reproduce a prediction error signal. Further, a decoded picture is generated from the prediction signal and the reproduced prediction error signal.

As has been described above, in the second embodiment, an entropy code table is selected in accordance with a combination between temporal prediction, which utilizes motion compensation signals, and spatial prediction, which utilizes images of adjacent blocks. Thus, compared with the first embodiment, the encoding/decoding method of the second embodiment may improve a possibility of selecting an appropriate code word to reduce the information amount of encoded information.

<Third Embodiment>

The applicant of the present patent application has found that a pixel with a great prediction error of luminance information also indicates a great prediction error of color difference information when the luminance information and the color difference information included in encoding target information are encoded. This means that there are correlations between the position of a pixel with a prediction error of luminance information and the position of a pixel with a prediction error of color difference information. These correlations exist regardless of which prediction signal generation scheme is employed from among inter prediction, bi-directional inter-frame prediction, and intra prediction. Further, these correlations also exist between R components, G components, and B components of an RGB signal.

The utilization of the above correlations makes it possible to estimate the distribution of prediction errors of luminance information from the distribution of prediction errors of color difference information. Accordingly, in the third embodiment, by adaptively selecting an entropy code table to be used for encoding luminance information in accordance with the distribution of prediction errors of color difference information, the efficiency in encoding luminance information is enhanced. The information amount of luminance information is at least several times that of color difference information. Accordingly, an increase in the efficiency in encoding luminance information greatly contributes to an increase in the efficiency in encoding an entire picture.

In the first and second embodiments, an entropy code table is selected in accordance with the distribution of differences between a plurality of motion compensation picture signals. By contrast, in the third embodiment, an entropy code table for encoding luminance information is selected in accordance with the distribution of prediction errors of color difference information. In other words, although the first through third embodiments select entropy code tables using different criteria, these embodiments may employ and perform substantially the same configurations and operations for encoding a prediction error signal by using the selected entropy code table.

Figure 15:
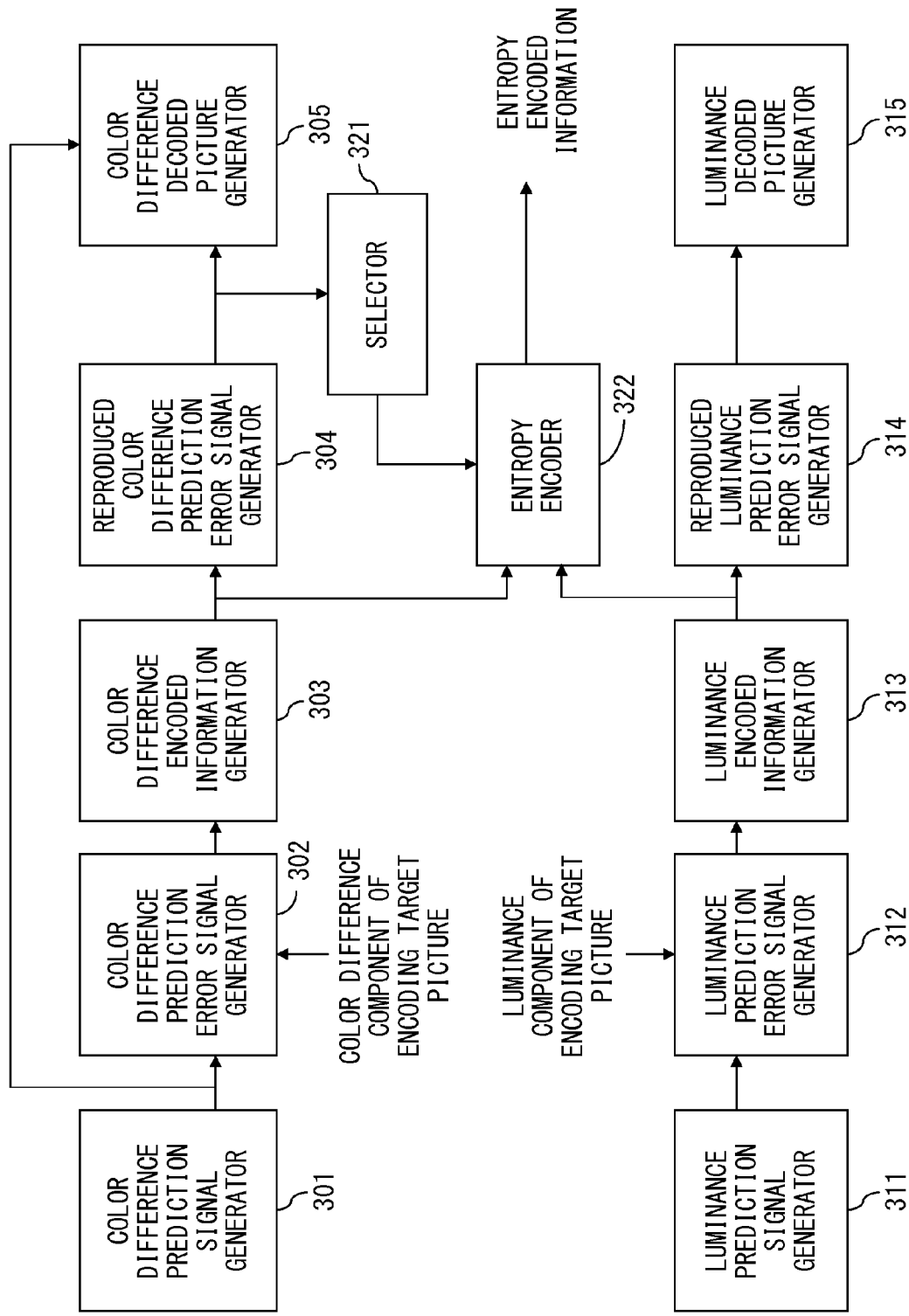
FIG. 15 illustrates a configuration of an encoder according to a third embodiment.

FIG. 15 illustrates a configuration of an encoder according to the third embodiment. Also in the third embodiment, each picture of a video is divided into a plurality of blocks, and the encoder encodes image data for each block. In the configuration illustrated in FIG. 15, a luminance component and a color difference component of an encoding target picture are input to an encoder.

In this example, the current picture block is represented by Y/Cb/Cr signals. Note that the image format of the Y/Cb/Cr signals is not limited particularly, and may be, for example, the 4:2:0 format, the 4:2:2 format, or the 4:4:4 format.

A color difference prediction signal generator 301 generates a color difference prediction signal representing a predicted value of color difference information of an encoding target picture. The color difference prediction signal generator 301 is implemented, for example, by inter prediction or bi-directional inter frame prediction employed by MPEG-1, MPEG-2, H.264, and the like or by intra prediction employed by H.264, and the like. Also, a prediction scheme for each block is determined by a specified prediction-mode determination algorithm.

A color difference prediction error signal generator 302 calculates the difference between the color difference information and the color difference prediction signal of an encoding target picture, and thereby generates color difference prediction error signal. A color difference encoded information generator 303 reduces redundancies of a color difference prediction error signal in the spatial direction, and generates color difference encoded information. The color difference encoded information generator 303 is implemented by, for example, a combination of an orthogonal transform and quantization employed by MPEG-1, MPEG-2, H.264, and the like. In such a case, color difference encoded information is a result of quantizing coefficients that have been orthogonally transformed. Also, the color difference encoded information generator 303 may be implemented by Wavelet transform, DPCM, vector quantization, employed by JPEG-2000, and the like.

A reproduced color difference prediction error signal generator 304 generates a reproduced color difference prediction error signal from color difference encoded information. The reproduced color difference prediction error signal generator 304 is implemented by, for example, a combination of an inverse orthogonal transform and inverse quantization employed by MPEG-1, MPEG-2, and H.264. Alternatively, the reproduced color difference prediction error signal generator 304 may be implemented by decoding process of DPCM or vector quantization, or the like.

A color difference decoded picture generator 305 adds the reproduced color difference prediction error signal to the color difference prediction signal, and thereby generates a color difference decoded picture. This decoded picture is stored as a reference picture to be used in a subsequent encoding process.

The configuration for encoding luminance information is substantially the same as the above described configuration for encoding color difference information. That is to say, a luminance prediction signal generator 311 generates a luminance prediction signal. A luminance prediction error signal generator 312 generates a luminance prediction error signal representing a difference between a luminance component of an encoding target signal and the luminance prediction signal. A luminance encoded information generator 313 generates encoded information of the luminance prediction error signal by performing, for example, an orthogonal transform and quantization. A reproduced luminance prediction error signal generator 314 reproduces a luminance prediction error signal by performing, for example, an inverse quantization process and inverse orthogonal transform. A luminance decoded picture generator 315 generates a decoded picture from the luminance prediction signal and the reproduced luminance prediction error signal. The decoded picture is used as a reference picture in a subsequent encoding process.

A selector 321 selects, in accordance with the distribution of color difference prediction errors, an entropy code table for decoding the luminance prediction error signal. The selector 321 detects the distribution of color difference prediction errors using the reproduced color difference prediction error signal generated by the reproduced color difference prediction error signal generator 304. However, the selector 321 may detect the distribution of color difference prediction errors using the color difference prediction error signal generated by the color difference prediction error signal generator 302.

The selector 321 can select an entropy code table using the method according to the first or second embodiment. In such a case, the selector 321 selects, in accordance with the number of non-zero coefficients of reproduced color difference prediction error signal, an entropy code table that minimizes the code length of encoded information.

An entropy encoder 322 encodes color difference encoded information, and also encodes luminance encoded information by utilizing the entropy code table selected by the selector 321. There are no limitations about how to select an entropy code table for encoding color difference encoded information, and it maybe selected by using a known technique.

FIG. 16 illustrates a configuration of a decoder according to the third embodiment. The decoder according to the third embodiment decodes an encoded data stream (entropy encoded information) generated by the encoder illustrated in FIG. 15. The decoder performs substantially the inverse processes of the encoding processes performed by the encoder. Also, the decoder performs decoding processes for each block.

Encoded information (decoding target information) input to the decoder is separated into color difference encoded information and luminance encoded information to be guided to a color difference entropy decoder 361 and a luminance entropy decoder 371, respectively. In addition, motion vector information is decoded by a decoding process unit (not illustrated).

The color difference entropy decoder 361 decodes color difference encoded information, and performs inverse zigzag scan, and thereby generates a coefficient sequence representing a color difference prediction error signal. A reproduced color difference prediction error signal generator 362 reproduces a color difference prediction error signal from a signal output from the color difference entropy decoder 361. A color difference prediction signal generator 363 generates a color difference prediction error signal. A color difference decoded picture generator 364 generates a color difference decoded picture from the color difference prediction signal and the reproduced color difference prediction error signal.

A selector 351 selects an entropy code table in accordance with the color difference prediction error signal reproduced by the reproduced color difference prediction error signal generator 362. The method for selecting an entropy code table may be the same as that used by the selector 321 included in the encoder illustrated in FIG. 15.

A luminance decoded picture is generated from luminance encoded information by using substantially the same method as that used for generating the color difference decoded picture. That is to say, the luminance entropy decoder 371 decodes luminance encoded information. A reproduced luminance prediction error signal generator 372 reproduces a luminance prediction error signal from a signal output from the luminance entropy decoder 371. A luminance prediction signal generator 373 generates a luminance prediction error signal. A luminance decoded picture generator 374 generates a luminance decoded picture from the luminance prediction signal and the reproduced luminance prediction error signal. In this generating, the luminance entropy decoder 371 decodes the luminance encoded information using the entropy code table selected by the selector 351.

<Variation>

In the above explanations, an entropy code table for encoding a prediction error signal is selected in accordance with the number of non-zero coefficients in an inter motion-compensation-signal difference signal. However, the encoding/decoding method according to embodiments is not limited to this configuration. In other words, it is also possible, for example, to employ a configuration in which an entropy word is determined in accordance with an inter motion-compensation-signal difference signal. In such a case, a table corresponding to non-zero coefficients in the inter motion-compensation-signal difference signal is selected from among entropy code tables #0 through #3 illustrated in FIGS. 6A through 6D. Next, code words corresponding to TrailingOnes and TotalCoeff of run-level information of the inter motion-compensation-signal difference signal are extracted. Then, the code words extracted from the selected entropy code table are output as TrailingOnes and TotalCoeff of a prediction error signal.

The encoding/decoding methods according to an embodiment may also select an entropy code table in accordance with the distribution pattern of orthogonal transform coefficients representing an inter motion-compensation-signal difference signal.

In the above explanations, an entropy code table is selected in accordance with the number of non-zero coefficients in the inter motion-compensation-signal difference signal after orthogonal transform and quantization. However, the method according to embodiments is not limited to this configuration. For example, quantization/inverse quantization on orthogonal transform coefficients is not essential to the encoders/decoders.

<Hardware Configuration>

Figure 17:
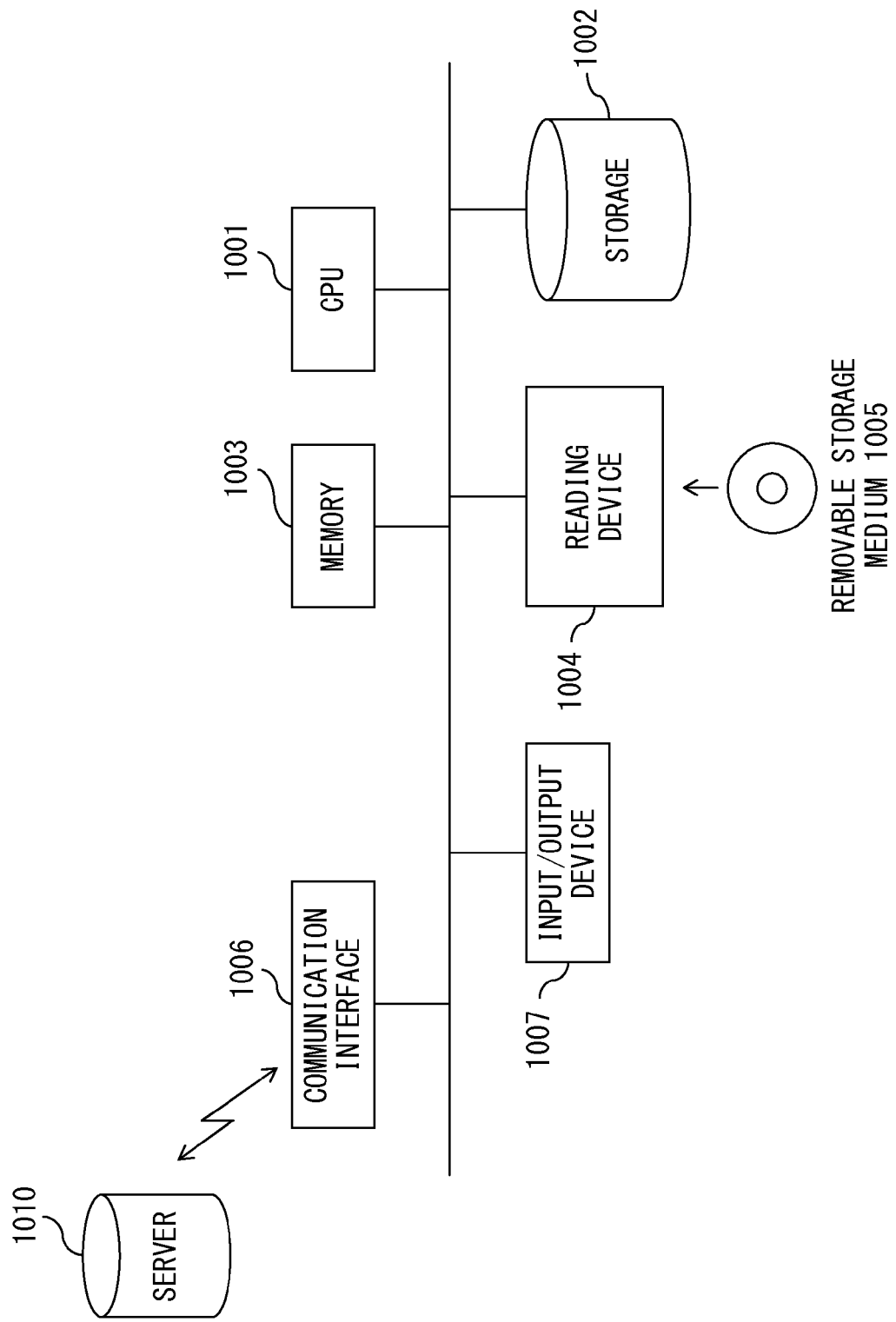
FIG. 17 illustrates a hardware configuration of the encoders or the decoders.

FIG. 17 illustrates a hardware configuration of the encoders or decoders (or a computer or a processor system to implement the encoding/decoding methods) according to the respective embodiments. In FIG. 17, a CPU 1001 uses memory 1003 in order to execute an encoding program or a decoding program. A storage 1002 stores the encoding program or the decoding program. Note that the storage 1002 may be an external storage. The memory 1003 is, for example, semiconductor memory, and is configured to have a RAM area and a ROM area.

A reading device 1004 accesses a removable storage medium 1005 in accordance with an instruction from the CPU 1001. The removable storage medium 1005 may be, for example, a semiconductor device, a medium that inputs and outputs information by utilizing magnetic effects, or a medium that inputs and outputs information by utilizing optical effects. A communication interface 1006 transmits and receives data via a network in accordance with instructions from the CPU 1001. An input/output device 1007 corresponds, in this example, to a display device, a device to receive instructions from a user, or the like.

The encoding program or the decoding program according to embodiments is provided, for example, in the forms described below.

(1) Provided already installed in the storage 1002
(2) Provided in the removable storage medium 1005
(3) Provided by being downloaded from a program server 1010

The encoders or the decoders according to the embodiments are implemented by executing the encoding program or the decoding program on a computer or a processor system described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A video encoder, comprising:
   a motion compensation picture signal generator configured to generate a plurality of motion compensation picture signals in accordance with an encoding target signal representing an encoding target picture and a plurality of reference pictures;
   a prediction signal generator configured to generate a prediction signal of the encoding target signal by utilizing the plurality of motion compensation picture signals;
   a prediction error signal generator configured to generate a prediction error signal representing a difference between the encoding target signal and the prediction signal;
   a selector configured to select an entropy code assignment rule that is expected to minimize an information amount of an encoded state of the prediction error signal from among a plurality of entropy code assignment rules for encoding the prediction error signal, in accordance with the plurality of motion compensation picture signals; and
   an entropy encoder configured to generate encoded information from the prediction error signal in accordance with the entropy code assignment rule selected by the selector.

2. The video encoder according to claim 1, wherein
   the motion compensation picture signal generator generates a first motion compensation picture signal from a reference picture for forward motion compensation and a second motion compensation picture signal from a reference picture for backward motion compensation, and
   the selector selects an entropy code assignment rule under which the entropy encoder generates encoded information in accordance with an inter motion-compensation-signal difference signal representing a difference between the first and second motion compensation picture signals.

3. The video encoder according to claim 2, further comprising
   an orthogonal transformer configured to generate a plurality of orthogonal transform coefficients by performing orthogonal transform on an input signal, wherein
   the orthogonal transformer generates a plurality of first orthogonal transform coefficients representing the inter motion-compensation-signal difference signal and a plurality of second orthogonal transform coefficients representing the prediction error signal;
   the selector selects an entropy code assignment rule under which the entropy encoder generates encoded information in accordance with the plurality of first orthogonal transform coefficients, and
   the entropy encoder encodes the plurality of second orthogonal transform coefficients in accordance with the entropy code assignment rule selected by the selector.

4. The video encoder according to claim 3, wherein
   the selector selects an entropy code assignment rule under which the entropy encoder generates encoded information in accordance with number of non-zero coefficients in the plurality of first orthogonal transform coefficients.

5. The video encoder according to claim 2, wherein
   the entropy encoder includes a plurality of entropy code tables respectively storing information with respect to the plurality of entropy code assignment rules,
   the selector selects an entropy code table based on the inter motion-compensation-signal difference signal from among the plurality of entropy code tables, and
   the entropy encoder generates encoded information from the prediction error signal by utilizing the entropy code table selected by the selector.

6. The video encoder according to claim 2, wherein
   the selector selects an entropy code assignment rule under which the entropy encoder generates encoded information in accordance with the inter motion-compensation-signal difference signal and an image of a block adjacent to the encoding target picture.

7. A video decoder that decodes encoded information generated by a video encoder, the video decoder comprising:
   a motion compensation picture signal generator configured to generate a plurality of motion compensation picture signals in accordance with a plurality of reference pictures;
   a prediction signal generator configured to generate a prediction signal of a decoded picture by utilizing the plurality of motion compensation picture signals;
   a selector configured to select an entropy code assignment rule based on the plurality of motion compensation picture signals from among a plurality of entropy code assignment rules for reproducing a prediction error signal from a decoding target signal;
   an entropy decoder configured to reproduce a prediction error signal from the decoding target signal in accordance with the entropy code assignment rule selected by the selector; and
   a decoded picture generator configured to generate a decoded picture from the prediction error signal and the prediction signal.

8. The video decoder according to claim 7, wherein
   the motion compensation picture signal generator generates a first motion compensation picture signal from a reference picture for forward motion compensation and a second motion compensation picture signal from a reference picture for backward motion compensation, and
   the selector selects an entropy code assignment rule under which the entropy decoder reproduces a prediction error signal in accordance with an inter motion-compensation-signal difference signal representing a difference between the first and second motion compensation picture signals.

9. The video decoder according to claim 8, further comprising
   an orthogonal transformer configured to generate a plurality of orthogonal transform coefficients by performing orthogonal transform on the inter motion-compensation-signal difference signal, wherein
   the selector selects an entropy code assignment rule under which the entropy decoder reproduces a prediction error signal in accordance with the plurality of orthogonal transform coefficients, and
   the entropy decoder reproduces a prediction error signal from the decoding target signal in accordance with the entropy code assignment rule selected the selector.

10. The video decoder according to claim 9, wherein
the selector selects an entropy code assignment rule under which the entropy decoder reproduces a prediction error signal in accordance with number of non-zero coefficients in the plurality of orthogonal transform coefficients.

11. The video decoder according to claim 8, wherein
the entropy decoder includes a plurality of entropy code tables respectively storing information with respect to the plurality of entropy code assignment rules,
the selector selects an entropy code table based on the inter motion-compensation-signal difference signal from among the plurality of entropy code tables, and
the entropy decoder reproduces a prediction error signal from the decoding target signal by utilizing the entropy code table selected by the selector.

12. The video decoder according to claim 8, wherein
the selector selects an entropy code assignment rule under which the entropy decoder reproduces a prediction error signal in accordance with the inter motion-compensation-signal difference signal and an image of a block adjacent to a decoding target picture.

13. A video encoding method, comprising:
generating a plurality of motion compensation picture signals in accordance with an encoding target signal representing an encoding target picture and a plurality of reference pictures;
generating a prediction signal of the encoding target signal by utilizing the plurality of motion compensation picture signals;
generating a prediction error signal representing a difference between the encoding target signal and the prediction signal;
selecting an entropy code assignment rule that is expected to minimize an information amount of an encoded state of the prediction error signal from among a plurality of entropy code assignment rules for encoding the prediction error signal, in accordance with the plurality of motion compensation picture signals; and
generating encoded information from the prediction error signal in accordance with the selected entropy code assignment rule.

14. A video decoding method of decoding encoded information generated by a video encoder, the video decoding method comprising:
generating a plurality of motion compensation picture signals in accordance with a plurality of reference pictures;
generating a prediction signal of a decoded picture by utilizing the plurality of motion compensation picture signals;
selecting an entropy code assignment rule based on the plurality of motion compensation picture signals from among a plurality of entropy code assignment rules for reproducing a prediction error signal from a decoding target signal;
reproducing a prediction error signal from the decoding target signal in accordance with the selected entropy code assignment rule; and
generating a decoded picture from the prediction error signal and the prediction signal.

15. A non-transitory computer-readable recording medium having stored therein a program for causing a computer to execute video encoding process, the video encoding process comprising:
generating a plurality of motion compensation picture signals in accordance with an encoding target signal representing an encoding target picture and a plurality of reference pictures;
generating a prediction signal of the encoding target signal by utilizing the plurality of motion compensation picture signals;
generating a prediction error signal representing a difference between the encoding target signal and the prediction signal;
selecting an entropy code assignment rule that is expected to minimize an information amount of an encoded state of the prediction error signal from among a plurality of entropy code assignment rules for encoding the prediction error signal, in accordance with the plurality of motion compensation picture signals; and
generating encoded information from the prediction error signal in accordance with the selected entropy code assignment rule.

16. A non-transitory computer-readable recording medium having stored therein a program for causing a computer to execute video decoding process of decoding encoded information generated by a video encoder, the video decoding process comprising:
generating a plurality of motion compensation picture signals in accordance with a plurality of reference pictures;
generating a prediction signal of a decoded picture by utilizing the plurality of motion compensation picture signals;
selecting an entropy code assignment rule based on the plurality of motion compensation picture signals from among a plurality of entropy code assignment rules for reproducing a prediction error signal from a decoding target signal;
reproducing a prediction error signal from the decoding target signal in accordance with the selected entropy code assignment rule; and
generating a decoded picture from the prediction error signal and the prediction signal.

17. A video encoder that encodes an encoding target signal including a luminance signal and a color difference signal, the video encoder comprising:
a luminance prediction signal generator configured to generate a luminance prediction signal representing a predicted value of a luminance signal;
a luminance prediction error signal generator configured to generate a luminance prediction error signal representing a difference between the luminance signal of the encoding target signal and the luminance prediction signal;
a color difference prediction signal generator configured to generate a color difference prediction signal representing a predicted value of a color difference signal;
a color difference prediction error signal generator configured to generate a color difference prediction error signal representing a difference between the color difference signal of the encoding target signal and the color difference prediction signal;
a selector configured to select an entropy code assignment rule that is expected to minimize an information amount of an encoded state of the luminance prediction error signal from among a plurality of entropy code assignment rules for encoding the luminance prediction error signal, in accordance with the color difference prediction error signal; and an entropy encoder configured to generate luminance encoded information from the luminance prediction error signal in accordance with the entropy code assignment rule selected by the selector.

18. The video encoder according to claim 17, further comprising:
a color difference encoded information generator configured to generate color difference encoded information from the color difference prediction error signal; and
a reproduced color difference prediction error signal generator configured to generate a reproduced color difference prediction error signal representing a predicted value of a prediction error of a color difference from the color difference encoded information, wherein
the selector selects an entropy code assignment rule under which the entropy encoder generates luminance encoded information, based on the reproduced color difference prediction error signal.

19. A video decoder that decodes encoded information including a luminance signal and a color difference signal generated by a video encoder, the video decoder comprising:
a luminance prediction signal generator configured to generate a luminance prediction signal representing a predicted value of a luminance signal;
a reproduced color difference prediction error signal generator configured to generate a reproduced color difference prediction error signal from color difference encoded information included in the encoded information;
a selector configured to select an entropy code assignment rule based on the reproduced color difference prediction error signal from among a plurality of entropy code assignment rules for reproducing a luminance prediction error signal from luminance encoded information included in the encoded information;
an entropy decoder configured to reproduce a luminance prediction error signal from the luminance encoded information in accordance with the entropy code assignment rule selected by the selector; and
a luminance decoded picture generator configured to generate a luminance decoded picture from the reproduced luminance prediction error signal and the luminance prediction signal.

20. A video encoding method of encoding an encoding target signal including a luminance signal and a color difference signal, the video encoding method comprising:
generating a luminance prediction signal representing a predicted value of a luminance signal;
generating a luminance prediction error signal representing a difference between the luminance signal of the encoding target signal and the luminance prediction signal;
generating a color difference prediction signal representing a predicted value of a color difference signal;
generating a color difference prediction error signal representing a difference between the color difference signal of the encoding target signal and the color difference prediction signal;
selecting an entropy code assignment rule that is expected to minimize an information amount of an encoded state of the luminance prediction error signal from among a plurality of entropy code assignment rules for encoding the luminance prediction error signal, in accordance with the color difference prediction error signal; and
generating luminance encoded information from the luminance prediction error signal by using the selected entropy code assignment rule.

21. A video decoding method of decoding encoded information including a luminance signal and a color difference signal generated by a video encoder, the video decoding method comprising:
generating a luminance prediction signal representing a predicted value of a luminance signal;
generating a reproduced color difference prediction error signal from color difference encoded information included in the encoded information;
selecting an entropy code assignment rule based on the reproduced color difference prediction error signal from among a plurality of entropy code assignment rules for reproducing a luminance prediction error signal from luminance encoded information included in the encoded information;
reproducing a luminance prediction error signal from the luminance encoded information by using the selected entropy code assignment rule; and
generating a luminance decoded picture from the reproduced luminance prediction error signal and the luminance prediction signal.

22. A non-transitory computer-readable recording medium having stored therein a program for causing a computer to execute video encoding process of encoding an encoding target signal including a luminance signal and a color difference signal, the video encoding process comprising:
generating a luminance prediction signal representing a predicted value of a luminance signal;
generating a luminance prediction error signal representing a difference between the luminance signal of the encoding target signal and the luminance prediction signal;
generating a color difference prediction signal representing a predicted value of a color difference signal;
generating a color difference prediction error signal representing a difference between the color difference signal of the encoding target signal and the color difference prediction signal;
selecting an entropy code assignment rule that is expected to minimize an information amount of an encoded state of the luminance prediction error signal from among a plurality of entropy code assignment rules for encoding the luminance prediction error signal, in accordance with the color difference prediction error signal; and
generating luminance encoded information from the luminance prediction error signal by using the selected entropy code assignment rule.

23. A non-transitory computer-readable recording medium having stored therein a program for causing a computer to execute video encoding process of decoding encoded information including a luminance signal and a color difference signal generated by a video encoder, the video decoding process comprising:
generating a luminance prediction signal representing a predicted value of a luminance signal;
generating a reproduced color difference prediction error signal from color difference encoded information included in the encoded information;
selecting an entropy code assignment rule based on the reproduced color difference prediction error signal from among a plurality of entropy code assignment rules for reproducing a luminance prediction error signal from luminance encoded information included in the encoded information;
reproducing a luminance prediction error signal from the luminance encoded information by using the selected entropy code assignment rule; and generating a luminance decoded picture from the reproduced luminance prediction error signal and the luminance prediction signal.

* * * * *